(12) United States Patent
Jang et al.

(10) Patent No.: US 7,133,109 B2
(45) Date of Patent: Nov. 7, 2006

(54) LIQUID CRYSTAL DISPLAY COMPRISING THE SPACERS DISPOSED NEAR THE LIQUID CRYSTAL INLET, WHEREIN THE SPACERS HAVE PRISM SHAPES OR ELLIPTICAL COLUMN SHAPES

(75) Inventors: Yun Jang, Yongin-si (KR); Hye-Rhee Han, Uiwang-si (KR); Kye-Hun Lee, Suwon-si (KR); Young-Goo Song, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 118 days.

(21) Appl. No.: 10/806,981

(22) Filed: Mar. 22, 2004

(65) Prior Publication Data

US 2004/0257518 A1    Dec. 23, 2004

(30) Foreign Application Priority Data

Jun. 17, 2003   (KR)   ............... 10-2003-0039240
Jul. 28, 2003   (KR)   ............... 10-2003-0051929

(51) Int. Cl.
*G02F 1/1339*   (2006.01)

(52) U.S. Cl. ............... 349/155; 349/156; 349/157; 349/189

(58) Field of Classification Search ............... 349/155, 349/156, 189, 190, 157
See application file for complete search history.

(56) References Cited

U.S. PATENT DOCUMENTS

| | | | |
|---|---|---|---|
| 6,705,584 B1 * | 3/2004 | Hiroshima et al. | 249/155 |
| 2002/0176046 A1 * | 11/2002 | Kitamura et al. | 349/153 |

* cited by examiner

*Primary Examiner*—David Nelms
*Assistant Examiner*—(Nancy) Thanh-Nhan P. Nguyen
(74) *Attorney, Agent, or Firm*—MacPherson Kwok Chen & Held LLP

(57) ABSTRACT

A liquid crystal display apparatus includes first and second substrates, a liquid crystal layer, a sealing member, and first and second spacers. The first substrate includes a first display part having a pixel electrode formed thereon. The second substrate includes a second display part having a common electrode. The liquid crystal layer is interposed between the first and second substrates. The seal line includes a liquid crystal inlet. The first spacer is disposed between the first and second display parts. The second spacer is disposed near the liquid crystal inlet. The second and third spacers prevent the cell gap of the liquid crystal inlet from being narrowed, so that a liquid crystal material may be injected easily completely. Thus, the liquid crystal material is completely filled to enhance the display quality.

33 Claims, 24 Drawing Sheets

LIQUID CRYSTAL DISPLAY COMPRISING THE SPACERS DISPOSED NEAR THE LIQUID CRYSTAL INLET, WHEREIN THE SPACERS HAVE PRISM SHAPES OR ELLIPTICAL COLUMN SHAPES

CROSS-REFERENCE TO RELATED APPLICATIONS

This application relies for priority upon Korean Patent Application No. 2003-39240 filed on Jun. 17, 2003, and Korean Patent Application No. 2003-51929 filed on Jul. 28, 2003, the contents of which are herein incorporated by reference in its entirety.

BACKGROUND OF THE INVENTION

1. Field of the Invention

The present invention relates to a liquid crystal display apparatus and a method of manufacturing the liquid crystal display apparatus, and more particularly to a liquid crystal display apparatus with completely filled liquid crystal material and a method of manufacturing the liquid crystal display apparatus.

2. Description of the Related Art

An arrangement of liquid crystal molecules is adjusted in accordance with electric fields applied to the liquid crystal molecules, so that optical characters are adjusted. A liquid crystal display apparatus uses liquid crystal molecules so as to display an image. The liquid crystal display apparatus includes a liquid crystal display panel. The liquid crystal display panel includes a thin film transistor substrate, a color filter substrate and a liquid crystal layer interposed between the thin film transistor substrate and the color filter substrate.

Generally, a thickness of the liquid crystal layer is in a range of a few μm.

A liquid crystal material is injected into between the thin film transistor substrate and the color filter substrate via a vacuum injection method to form the liquid crystal layer. In order to inject the liquid crystal material into between the thin film transistor substrate and the color filter substrate via vacuum injection method, a seal line is formed along an edge of the thin film transistor substrate or the color filter substrate. However, the seal line is not a closed curve. That is, a portion of the seal line is opened to form a liquid crystal inlet. Then, the color filter substrate and the thin film transistor substrate are assembled together via the seal line, so that a liquid crystal receiving space defined by the seal line is formed between the thin film transistor substrate and the color filter substrate.

In a chamber having a vacuum pressure, the liquid crystal inlet is dipped in the liquid crystal material. Then, a pressure of the chamber increases, so that the liquid crystal material is injected into the liquid crystal receiving space, because a pressure of the liquid crystal receiving space is lower than the an environmental pressure. Then, a sealing member seals the liquid crystal inlet.

However, according to the general vacuum injection method, the liquid crystal receiving space may not be completely filled because the liquid crystal inlet may be narrowed in an assembling process of the thin film transistor substrate and the color filter substrate.

When the liquid crystal receiving space is not completely filled, a display quality is deteriorated.

SUMMARY OF THE INVENTION

Accordingly, the present invention is provided to substantially obviate one or more problems due to limitations and disadvantages of the related art.

It is a feature of the present invention to provide a liquid crystal display apparatus with a completely injected liquid crystal material.

It is another feature of the present invention to provide a method of manufacturing the liquid crystal display apparatus.

In one aspect of the liquid crystal display apparatus, the liquid crystal display apparatus includes first and second substrates, a liquid crystal layer, a sealing member, and first and second spacers. The first substrate includes a first display part having a pixel electrode formed thereon. The second substrate includes a second display part having a common electrode that faces the pixel electrode. The liquid crystal layer is interposed between the first and second substrates. The seal line includes a liquid crystal inlet. The seal line defines the first and second display parts. The first spacer is disposed between the first and second display parts. The first spacer maintains a cell gap formed between the first and second substrates. The second spacer is disposed near the liquid crystal inlet. The second spacer also maintains the cell gap.

In another aspect of the method of manufacturing a liquid crystal display apparatus, a first display part is formed on a first mother substrate. A second display part is formed on a second mother substrate, such that the second display part faces the first display part. A seal line having a liquid crystal inlet is formed along a boundary of the first display part. First and second spacers are formed on the first display part and outside of the first display part corresponding to the liquid crystal inlet respectively. The first and second mother substrates are assembled together. The first and second display parts are separated from the first and second mother substrates. A liquid crystal material is injected into between the first and second display parts via the liquid crystal inlet. Then, the liquid crystal inlet is sealed.

In another aspect of the method of manufacturing a liquid crystal display apparatus, a first display part is formed on a first mother substrate. A second display part is formed on a second mother substrate, such that the second display part faces the first display part. A seal line having a liquid crystal inlet is formed along a boundary of the second display part. First and second spacers are formed on the second display part and outside of the first display part corresponding to the liquid crystal inlet respectively. The first and second mother substrates are assembled together. The first and second display parts are separated from the first and second mother substrates. A liquid crystal material is injected into between the first and second display parts via the liquid crystal inlet. Then, the liquid crystal inlet is sealed.

According to the present invention, the second and third spacers prevent the cell gap of the liquid crystal inlet from being narrowed, so that a liquid crystal material may be easily injected completely. Thus, the liquid crystal material is completely filled to enhance the display quality.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE PREFERRED EMBODIMENT

Hereinafter, the preferred embodiments of the present invention will be described in detail with reference to the accompanied drawings.

Embodiment 1

Figure 1:
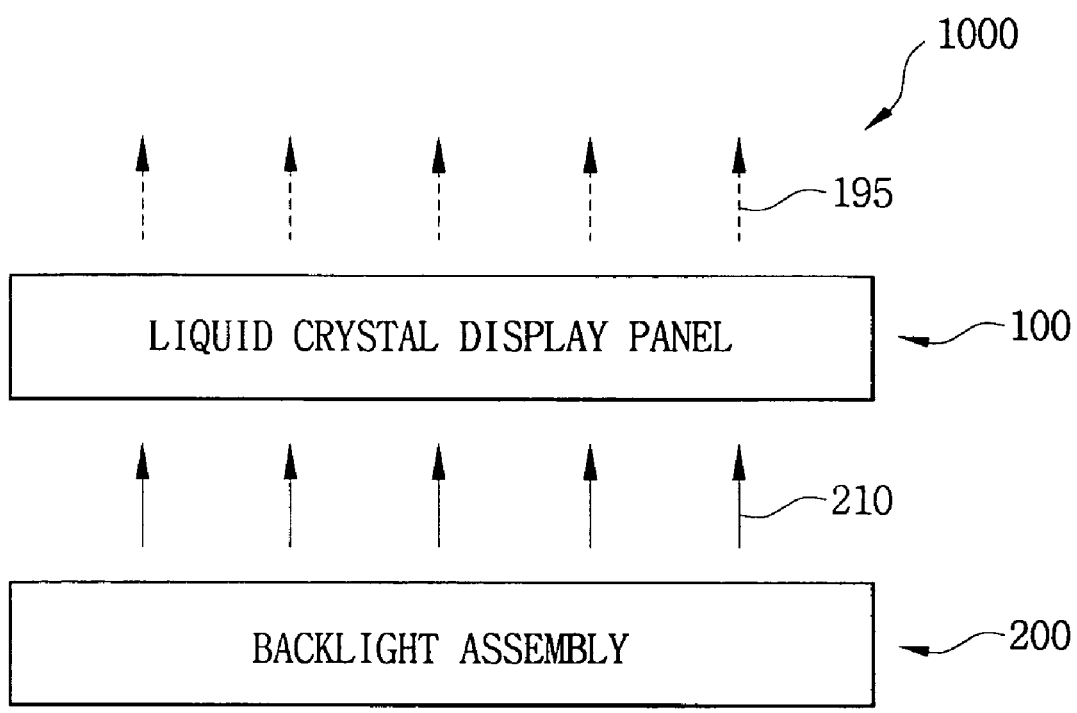
FIG. 1 is a schematic view showing a liquid crystal display apparatus according to a first exemplary embodiment of the present invention.

FIG. 1 is a schematic view showing a liquid crystal display apparatus according to a first exemplary embodiment of the present invention.

Referring to FIG. 1, a liquid crystal display apparatus 1000 according to a first exemplary embodiment of the present invention includes a liquid crystal display panel 100 and a backlight assembly 200.

The backlight assembly 200 provides the liquid crystal display panel 100 with a light 210 that contains no information. The liquid crystal display panel 100 transforms the light 210 into an image light 195 that contains image information.

Figure 2:
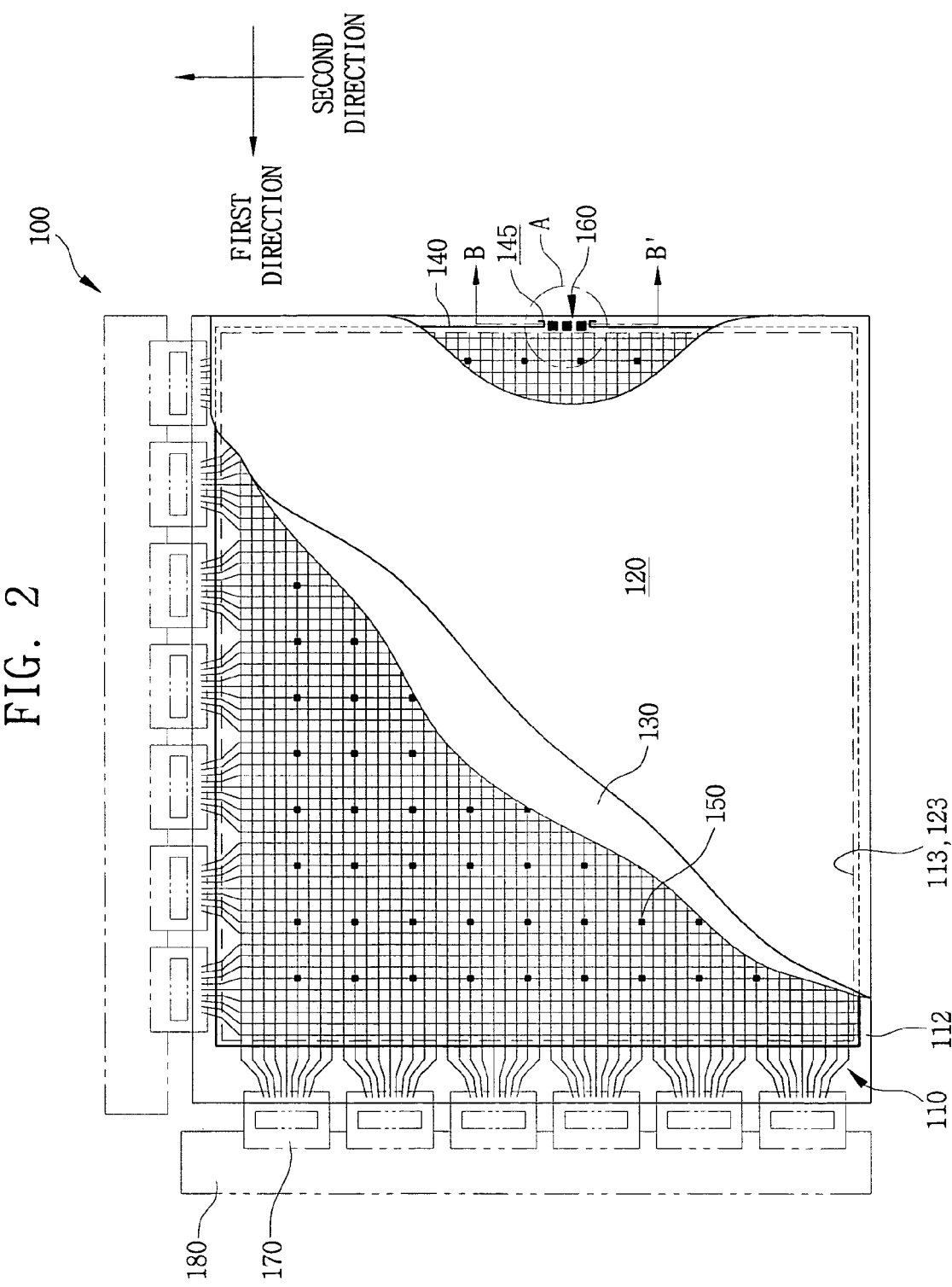
FIG. 2 is a partially cut out plan view showing a liquid crystal display panel of FIG. 1.

FIG. 2 is a partially cut-out plan view showing a liquid crystal display panel of FIG. 1.

Referring to FIG. 2, a liquid crystal display panel 100 includes first and second substrates 110 and 120, a seal line 140, and first and second spacers 150 and 160.

Figure 3:
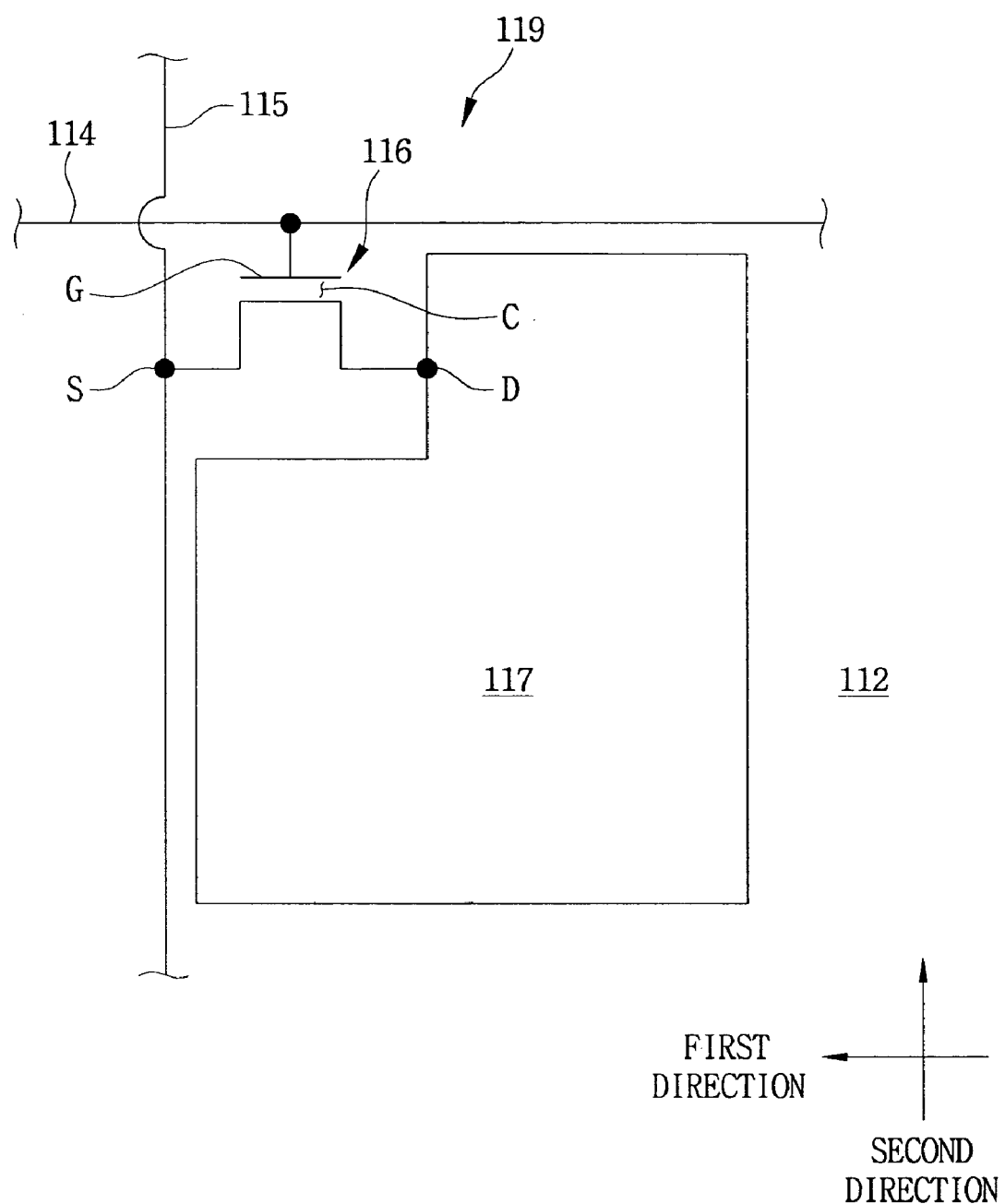
FIG. 3 is a schematic view showing a pixel of the liquid crystal display panel of FIG. 2.

FIG. 3 is a schematic view showing a pixel of the liquid crystal display panel of FIG. 2.

Referring to FIGS. 2 and 3, the first substrate 110 includes a first transparent substrate 112 and a pixel 119.

The first transparent substrate 112 has a rectangular plate shape. A light transmittance of the first transparent 112 may be substantially same as a glass. For example, the first transparent substrate 112 comprises glass. The first transparent substrate 112 includes a first display part 113. A pixel 119 is disposed on the first display part 113.

Figure 4:
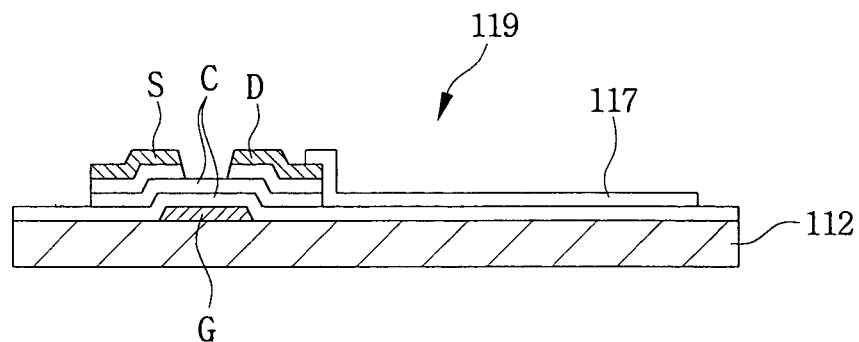
FIG. 4 is a cross-sectional view showing a thin film transistor and a pixel electrode formed on the first substrate of FIG. 2.

FIG. 4 is a cross-sectional view showing a thin film transistor and a pixel electrode formed on the first substrate of FIG. 2.

Referring to FIGS. 3 and 4, a plurality of pixels 119 is disposed in the first display part 113. The pixels 119 are arranged in a matrix shape. For example, when a liquid crystal display apparatus has a resolution that is 1024×768, and displays a full color, 1024×763×3 number of pixels 119 are formed on the first display part 113.

Each of the pixels 119 includes a gate line 114, a data line 115, a thin film transistor 116 and a pixel electrode 117. The gate line 114 extends in a first direction. 768 number of gate lines are arranged in parallel. The gate line 114 comprises a material that has good electric property, for example, such as aluminum or aluminum alloy.

The data line 115 is electrically insulated from the gate line 114. The data line 115 extends in a second direction that is substantially perpendicular to the first direction.

1024×3 number of data lines 115 are arranged in parallel. The data line 115 also comprises a material that has good electric property, for example, such as aluminum or aluminum alloy.

The thin film transistor 116 is electrically connected to the gate line 114 and the data line 115. The thin film transistor 116 includes a gate electrode G, a source electrode S, a channel layer C and a drain electrode D.

The gate line 114 that extends in the first direction protrudes in the second direction to form the gate electrode G. 1024×3 number of gate electrode G is formed spaced apart per gate line.

The channel layer C is formed on the gate electrode G, such that the electrically insulated from the gate electrode G. The channel layer comprises amorphous silicon or n+ amorphous silicon.

The source electrode S is electrically connected to the data line 115. 768 number of source electrodes are formed per data line 115. The source electrode S is formed on the channel layer C.

The drain electrode D is electrically insulated from the source electrode S. The drain electrode D is also formed on the channel layer C.

The pixel electrode 117 comprises a material that is optically transparent and electrically conductive, for example, such as indium tin oxide (ITO) and indium zinc oxide (IZO).

The pixel electrode 117 is formed on a pixel region defined by the gate line 114 and the data line 115. The pixel electrode 117 is electrically connected to the drain electrode D of the thin film transistor 116.

Figure 5:
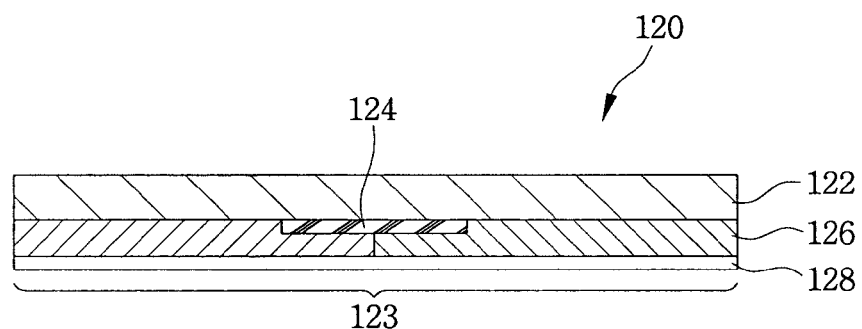
FIG. 5 is a cross-sectional view showing a second substrate of the liquid crystal display panel of FIG. 2.

FIG. 5 is a cross-sectional view showing a second substrate of the liquid crystal display panel of FIG. 2.

Referring to FIGS. 1, 4 and 5, the second substrate 120 includes a second transparent substrate 122, a light blocking layer 124, a color filter 126 and a common electrode 128. The second substrate 120 is disposed, such that the common electrode 128 faces the pixel electrode 117.

The second transparent substrate 122 has a rectangular plate shape. A transmittance of the second transparent substrate 122 is substantially same as glass. For example, the second transparent substrate 122 comprises the glass. The second transparent substrate 122 includes a second display part 123. The light blocking layer 124, the color filter 126 and the common electrode 128 are formed in the second display part 123. The second display part 123 faces the first display part 113 of the first substrate 110, and the first and second display parts 113 and 123 are substantially same as in area and shape.

The light blocking layer 124 comprises a metal such as chromium (Cr) or chromium oxide ($CrO_2$), or an organic material. The light blocking layer 124 has openings corresponding to the pixel electrode 117 of the first substrate 110. Thus, the light blocking layer 124 allows a first light that penetrates the pixel electrode 117 to pass through the openings, and the light blocking layer 124 blocks a second light that penetrates through between the pixel electrodes 117 so as to enhance a display quality.

The color filter 126 is formed on the second transparent substrate 122, such that the color filter 126 faces the pixel electrode 117. The color filter 126 includes a red color filter, a green color filter and a blue color filter. The red color filter allows only a light that has a wavelength corresponding to a red color to pass through the red color filter. The green color filter allows only a light that has a wavelength corresponding to a green color to pass through the green color filter. The blue color filter allows only a light that has a wavelength corresponding to a blue color to pass through the blue color filter.

The common electrode 128 is formed on the color filter 126 covering all region of the second transparent substrate 122. The common electrode 128 comprises a material that is optically transparent and electrically conductive, for example, such as indium tin oxide (ITO) and indium zinc oxide (IZO).

Referring again to FIGS. 1 to 5, the liquid crystal layer 130 is interposed between the first and second substrates 110 and 120. A thickness of the liquid crystal layer 130 is in the range from about 3 μm to about 5 μm. A pixel voltage is applied to the pixel electrode 117, and a reference voltage is applied to the common electrode 128. Then, an arrangement of liquid crystal molecules of the liquid crystal layer 130 is adjusted according to electric fields formed between the pixel electrode 117 and the common electrode 128, so that an optical transmittance of the liquid crystal layer is adjusted.

The seal line 140 comprises a thermosetting material and adhesive. The seal line 140 surrounds the first display part 113 of the first substrate 110 or the second display part 123 of the second substrate 120 to define a space between the first and second display parts 113 and 123.

The seal line 140 combines the first and second substrates 110 and 120. Further, the seal line 140 confines the liquid crystal material. The seal line 140 also forms a cell gap that corresponds to a distance between the first and second substrates 110 and 120.

The seal line 140 surrounds the first display part 113 or the second display part 123. However, the seal line 140 does not form a closed curve. That is, the seal line 140 has an opening portion corresponding to a liquid crystal inlet 145. A width of the liquid crystal inlet is in the range from about 11 mm to about 20 mm.

Referring again to FIG. 2, an organic layer comprising an organic material is patterned to form the first spacer 150 in the first and second display parts 113 and 123.

The seal line 140 forms the cell gap between the first and second substrates 110 and 120, and the first spacer 150 maintains the cell gap.

Figure 6:
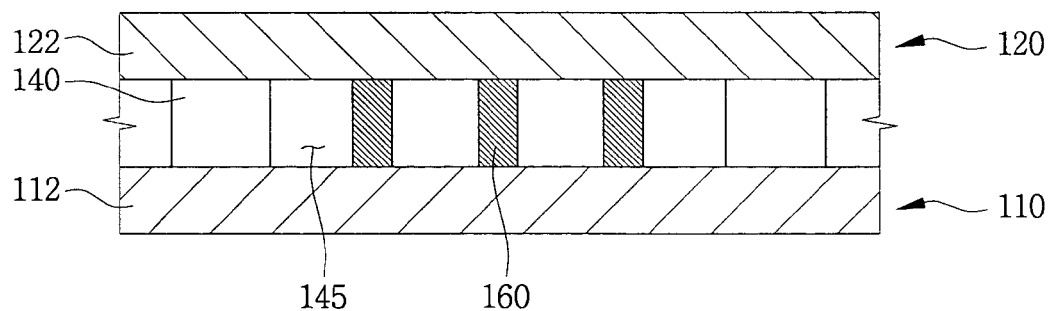
FIG. 6 is a cross-sectional view taken along the line B–B' of FIG. 2.

FIG. 6 is a cross-sectional view taken along the line B–B' of FIG. 2.

Referring to FIG. 6, at least one second spacer 160 is formed at circumference of the liquid crystal inlet 145 of the seal line 140 surrounding the first and second display parts 113 and 123. The second spacer 160 prevents the liquid crystal inlet 145 from being narrowed, so that a liquid crystal material may be injected easily into a liquid crystal receiving space that is formed between the first and second substrates 110 and 120 via the liquid crystal inlet 145.

Then, a sealing member seals the liquid crystal inlet. The sealing member prevents the liquid crystal material from flowing out via the liquid crystal inlet 145.

The sealing member comprises a material that is hardened, when an ultraviolet light is irradiated onto the material.

A tape carrier package and a driver printed circuit board are attached on the first substrate 100. A pixel voltage and a reference voltage are applied to the first substrate 100 via the tape carrier package and the driver printed circuit board.

According to the present embodiment, a first spacer 150 is formed in the first and second display parts 113 and 123, and a second spacer 160 is formed at a circumference of a liquid crystal inlet 145, so that the liquid crystal inlet 145 is not narrowed. Thus, a liquid crystal material may be injected easily into a liquid crystal receiving space, so that deterioration of a display quality is prevented.

Embodiment 2

Figure 7:
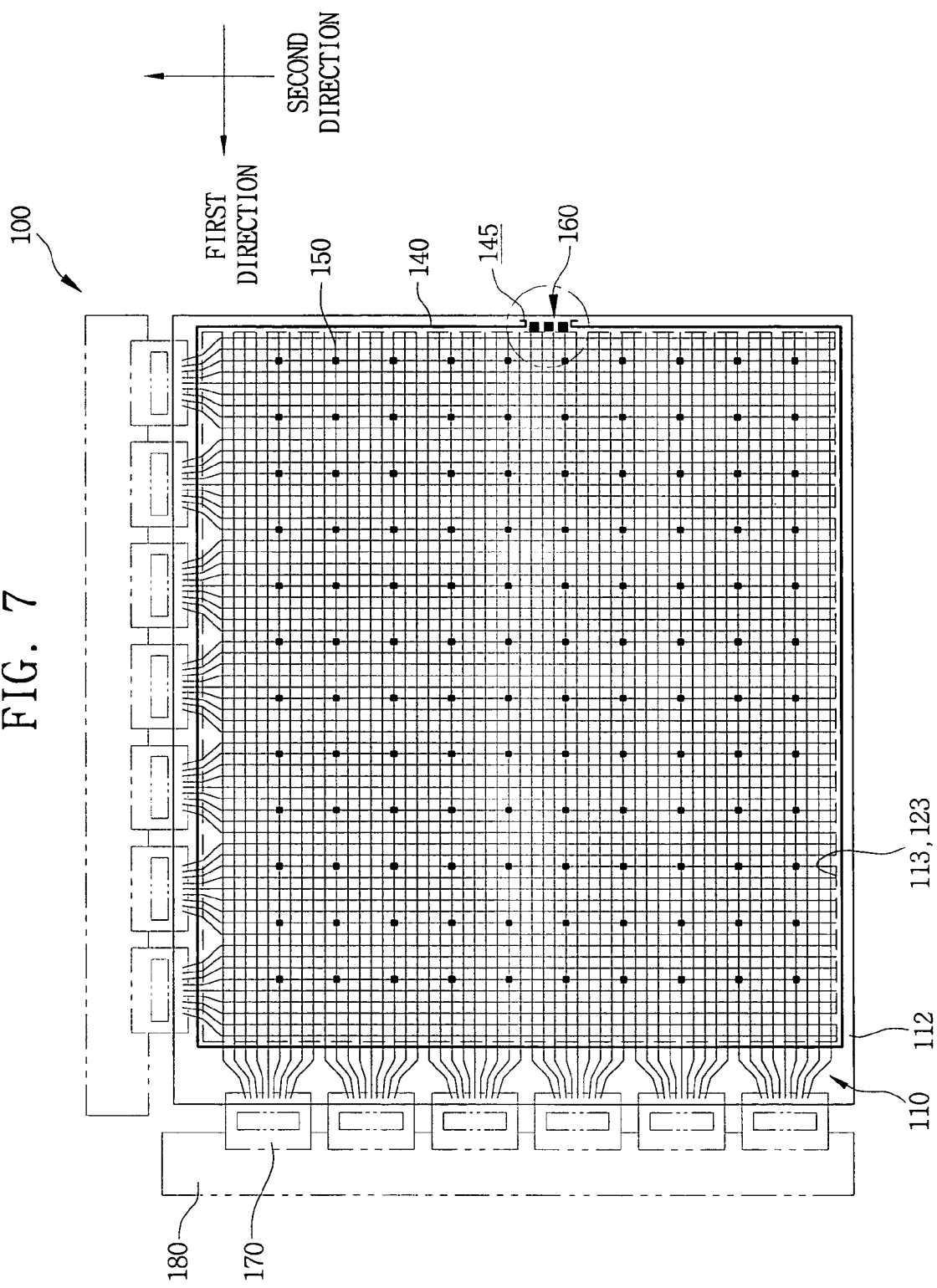
FIG. 7 is plan view showing first and second spacers formed on a first substrate according to a second exemplary embodiment of the present invention.
Figure 8:
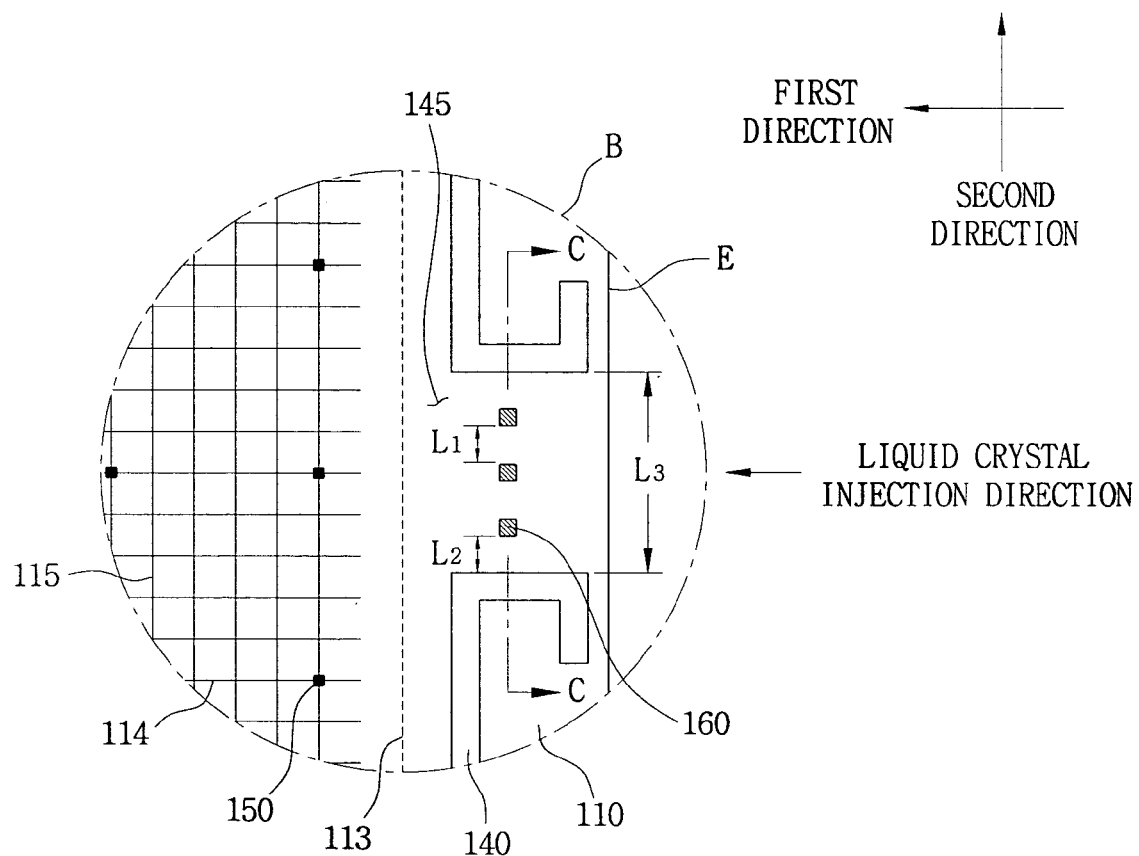
FIG. 8 is a partially enlarged view showing a portion 'B' of FIG. 7.
Figure 9:
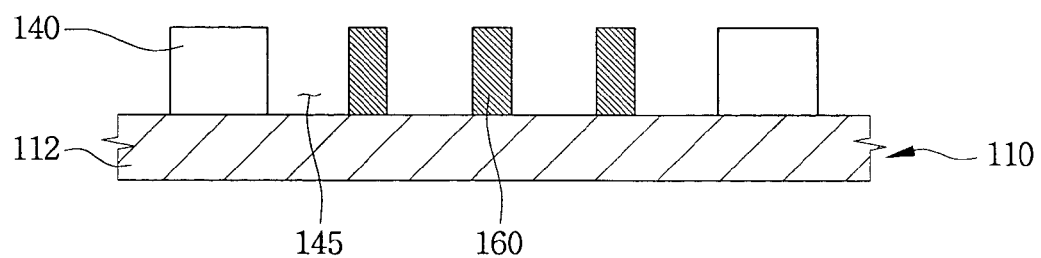
FIG. 9 is a cross-sectional view taken along a line C–C'.

FIG. 7 is plan view showing first and second spacers formed on a first substrate according to a second exemplary embodiment of the present invention. FIG. 8 is a partially enlarged view showing a portion 'B' of FIG. 7, and FIG. 9 is a cross-sectional view taken along a line C–C'. The first substrate is same as in Embodiment 1 except for a shape and arrangement of second spacers. Thus, the same reference numerals will be used to refer to the same or like parts as those described in Embodiment 1 and any further explanation will be omitted.

Referring to FIGS. 7 to 9, first and second spacers 150 and 160 are formed on a first substrate 110 of a liquid crystal display panel 100. The first spacer 150 is formed in a first display part 113, and the second spacer 160 is formed at a circumference of a liquid crystal inlet 145.

The second spacer 160 is disposed at the circumference of the liquid crystal inlet 145 so as to prevent the liquid crystal inlet 145 from being narrowed. That is, the second spacer 160 prevents a cell gap of the liquid crystal inlet 145, which is formed between first and second substrates, from being narrowed.

According to the present embodiment, a plurality of the second spacers 160 is formed in the liquid crystal inlet 145. In detail, when a liquid crystal material is injected in a first direction, the second spacers 160 are disposed in parallel with a second direction that is substantially perpendicular to the first direction.

The second spacers 160 may be disposed between an edge 'E' of the first substrate 110 and the first display part 113. An arrangement of the second spacers 160 is determined according to a force applied to the first substrate 110 or the second substrate 120.

In the present embodiment, the second spacers 160 is larger than the first spacers 150 in volume, and the second spacers 160 is denser than the first spacers 150 (or a number of the second spacers 160 per unit area is greater than a number of the first spacers 150 per unit area), so that a liquid crystal material may be injected via the liquid crystal inlet 145 easily.

A first distance L1 between the second spacers 160 is in the range from about 1.5 mm to about 2.0 mm. For example, when the first distance L1 is smaller than 1.5 mm, the second spacers 160 may block the liquid crystal material that flows into between the first and second substrates via the liquid crystal inlet 145. On the contrary, when the first distance L1 is greater than 2.0 mm, the second spacers 160 may not prevent the liquid crystal inlet 145 from being narrowed. Thus, the liquid crystal material may not be injected easily via the liquid crystal inlet 145.

A second distance L2 between an edge of the liquid crystal inlet 145 and the second spacer 160 is in the range from about 0.5 mm to about 1.5 mm. For example, when the second distance L2 is smaller than 0.5 mm, an apparatus of forming the seal line 140 may not detect an exact position on which the seal line is formed. Thus, the seal line 140 may not be exactly formed. On the contrary, when the second distance L2 is greater than 1.5 mm, a cell gap between the first and second substrates 110 and 120 may be narrowed, so that the liquid crystal material may be easily injected.

In the present embodiment of the present invention, the second spacer 160 is formed on the first substrate 110, so that the liquid crystal material may be easily injected.

Embodiment 3

Figure 10:
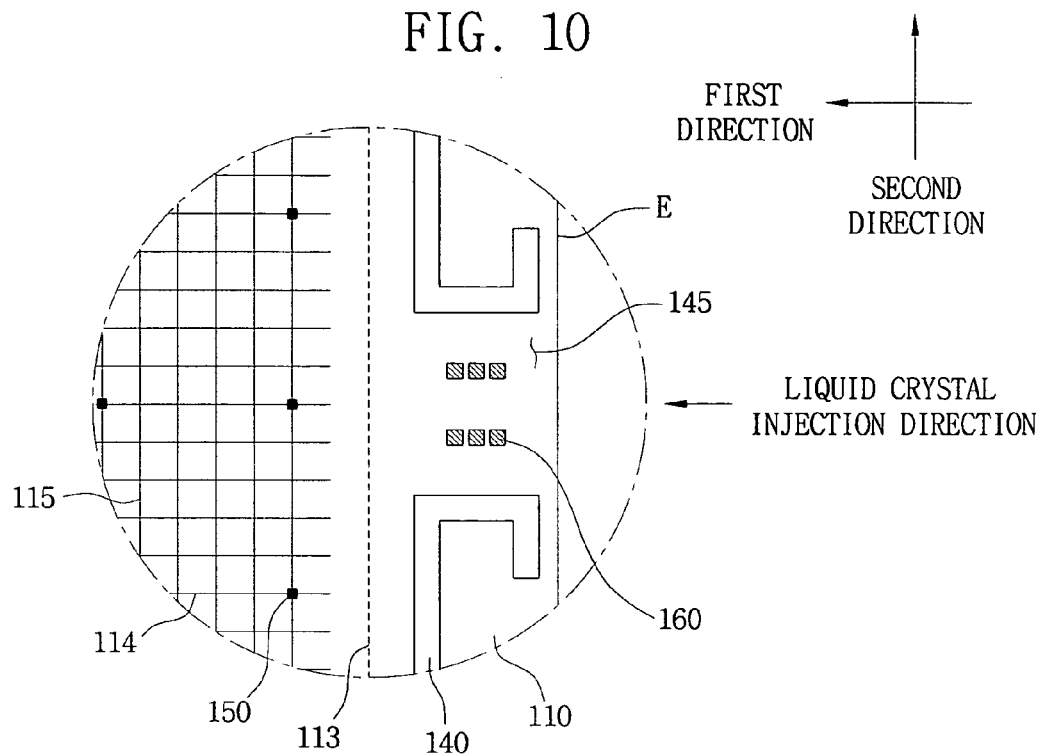
FIG. 10 is an enlarged view showing a second spacer according to a third exemplary embodiment of the present invention.

FIG. 10 is an enlarged view showing a second spacer according to a third exemplary embodiment of the present invention. The liquid crystal display apparatus is same as in Embodiment 2 except for an arrangement of second spacers. Thus, the same reference numerals will be used to refer to the same or like parts as those described in Embodiment 2 and any further explanation will be omitted.

Referring to FIG. 10, when a liquid crystal material is injected in a first direction, a plurality of second spacers 160 are arranged in the first direction. For example, in the present embodiment, two columns of the second spacers 160 are formed along the second direction. Each of columns includes a plurality of the second spacers 160 in the first direction. Then, the second spacers 160 maintain a cell gap formed between the first and second substrates, while it minimizes a blocking of a liquid crystal material. Thus, the liquid crystal material may be easily injected via the liquid crystal inlet 145.

According to the present embodiment, a plurality of the second spacers 160 is arranged in a liquid crystal injecting direction of a liquid crystal material. Thus, the second spacers 160 may not block the liquid crystal material, so that the liquid crystal material may be easily injected, while preventing the liquid crystal inlet 145 from being narrowed.

Embodiment 4

Figure 11:
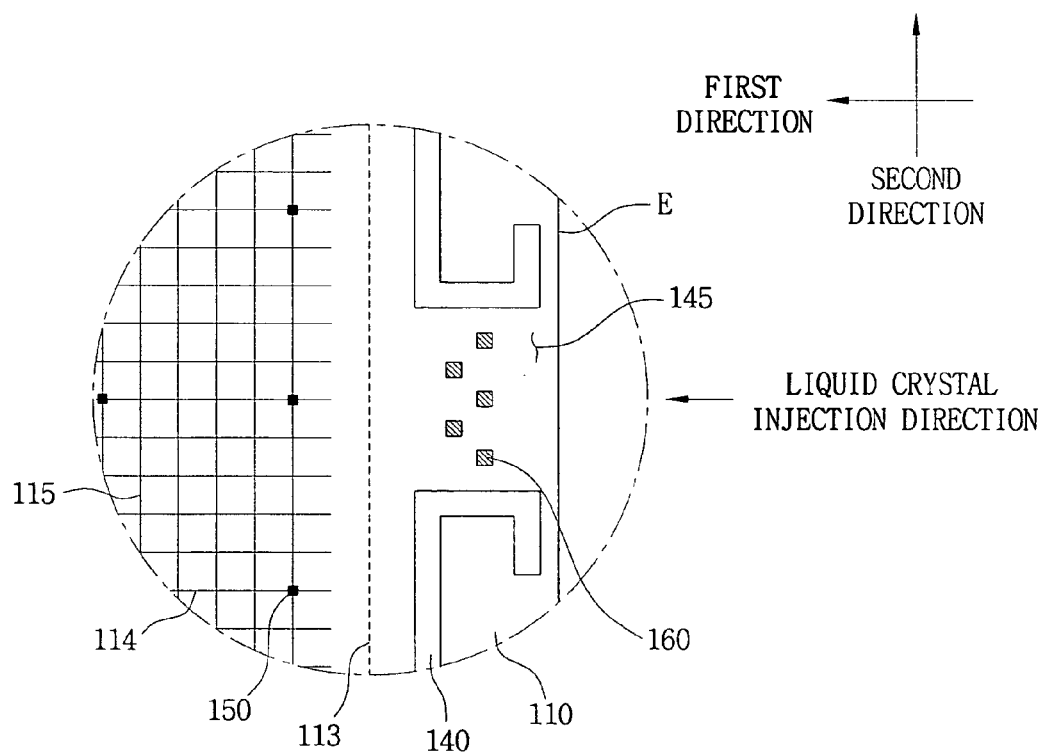
FIG. 11 is an enlarged view showing a second spacer according to a fourth exemplary embodiment of the present invention.

FIG. 11 is an enlarged view showing a second spacer according to a fourth exemplary embodiment of the present invention. The liquid crystal display apparatus is same as in Embodiment 2 except for an arrangement of second spacers. Thus, the same reference numerals will be used to refer to the same or like parts as those described in Embodiment 2 and any further explanation will be omitted.

Referring to FIG. 11, second spacers 160 are arranged in a zigzag form, so that the second spacers 160 maintain a cell gap between first and second substrates, while the second spacers 160 are not blocking a liquid crystal material. Further, the second spacer 160 is disposed widely between the first and second substrate so that even when an excessive force is applied, the second spacer 160 may maintain the cell gap.

According to the present embodiment, a plurality of the second spacers 160 is arranged in a zigzag form in the liquid crystal inlet 145 so as to maintain the cell gap between the first and second substrates. Thus, the liquid crystal material may be easily injected into between the first and second substrates.

Embodiment 5

Figure 12:
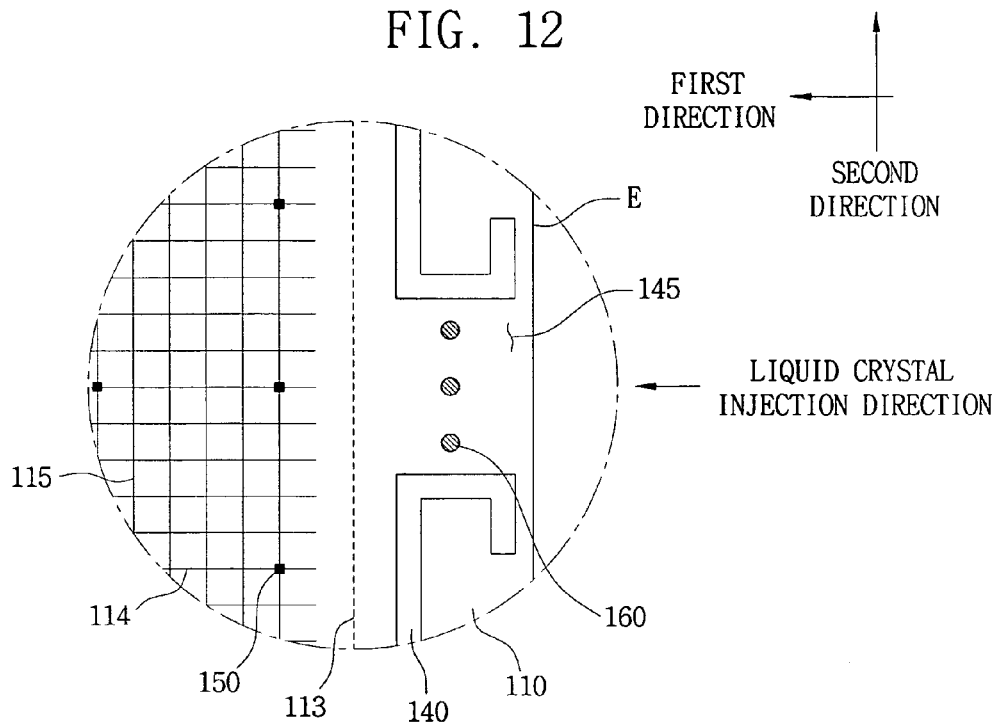
FIG. 12 is an enlarged view showing a second spacer according to a fifth exemplary embodiment of the present invention.

FIG. 12 is an enlarged view showing a second spacer according to a fifth exemplary embodiment of the present invention. The liquid crystal display apparatus is same as in Embodiment 2 except for a shape of second spacers. Thus, the same reference numerals will be used to refer to the same or like parts as those described in Embodiment 2 and any further explanation will be omitted.

Referring to FIG. 12, second spacers 160 formed in a liquid crystal inlet 145 has a cylindrical shape. The second spacers 160 may have a truncated cone shape. When the second spacers 160 has the cylindrical shape or the truncated cone shape, a friction between the second spacers 160 and a liquid crystal material that is to be injected into between first and second substrates is reduced. Thus, the liquid crystal may be easily injected, while preventing the liquid crystal inlet 145 from being narrowed.

According to the present embodiment, each of the second spacers 160 has the cylindrical shape, or the truncated cone shape, so that the liquid crystal material may be easily injected into between the first and second substrates.

Embodiment 6

Figure 13:
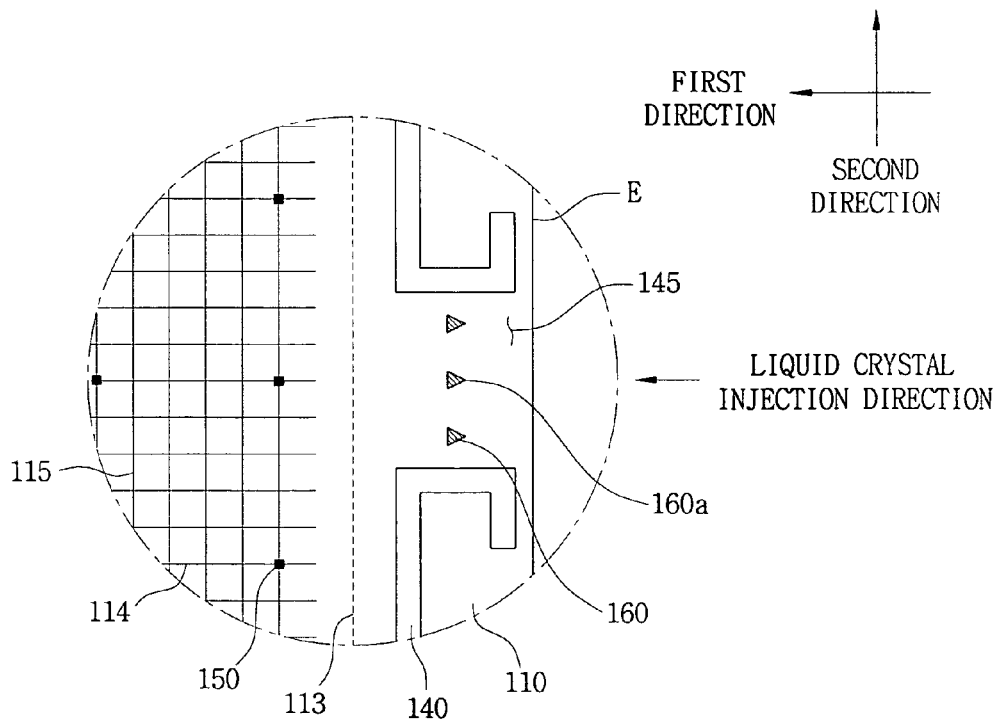
FIG. 13 is an enlarged view showing a second spacer according to a sixth exemplary embodiment of the present invention.

FIG. 13 is an enlarged view showing a second spacer according to a sixth exemplary embodiment of the present invention. The liquid crystal display apparatus is same as in Embodiment 2 except for a shape of second spacers. Thus, the same reference numerals will be used to refer to the same or like parts as those described in Embodiment 2 and any further explanation will be omitted.

Referring to FIG. 13, second spacers 160 formed in a liquid crystal inlet 145 has a triangular prism shape, such that an edge of the triangular prism extends outward. Thus, a liquid crystal material may be injected easily via a liquid crystal inlet 145, because a friction between the second spacers 160 and the liquid crystal material is reduced.

However, the friction between the second spacers 160 and the liquid crystal material increases when the liquid crystal material flows out. Thus, the second spacers 160 prevent the liquid crystal material from being leaked.

According to the present embodiment, the second spacers 160 have a triangular shape of which edge faces an injection direction of a liquid crystal molecule. Thus, a friction between the liquid crystal material and the second spacers 160 is reduced.

Embodiment 7

Figure 14:
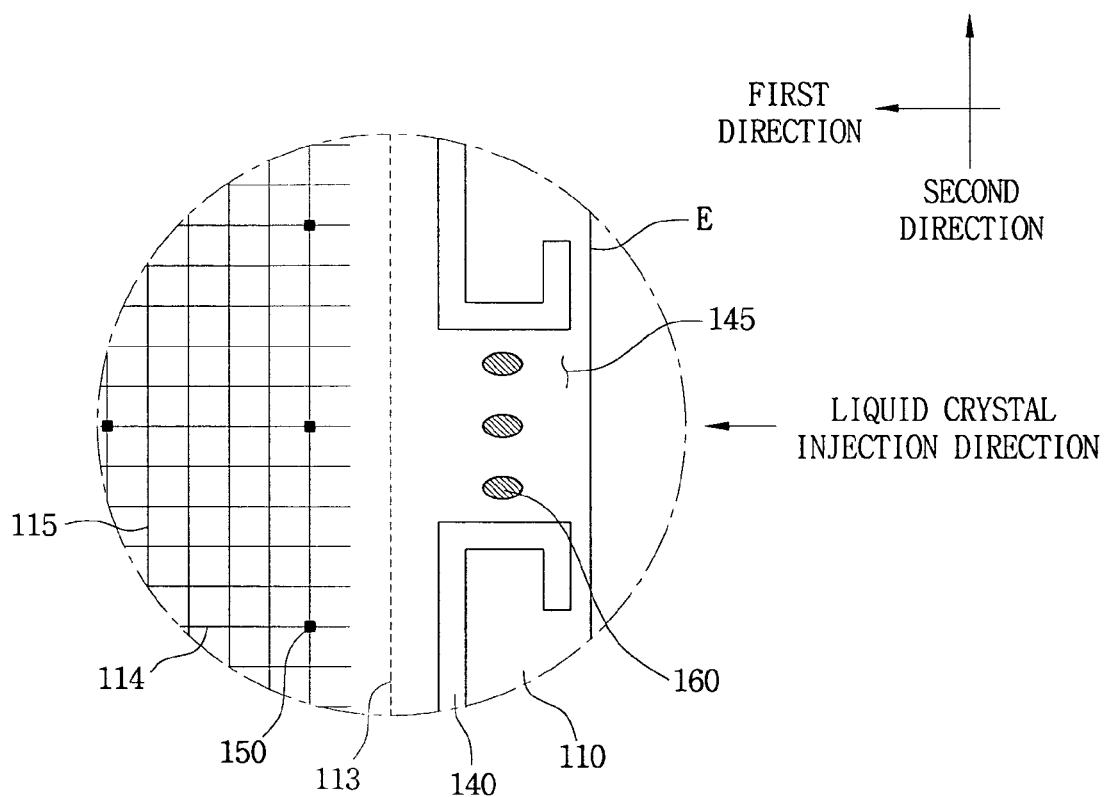
FIG. 14 is an enlarged view showing a second spacer according to a seventh exemplary embodiment of the present invention.

FIG. 14 is an enlarged view showing a second spacer according to a seventh exemplary embodiment of the present invention. The liquid crystal display apparatus is same as in Embodiment 2 except for a shape of second spacers. Thus, the same reference numerals will be used to refer to the same or like parts as those described in Embodiment 2 and any further explanation will be omitted.

Referring to FIG. 14, second spacers 160 formed in a liquid crystal inlet 145 have an elliptical column shape, so that a friction between the second spacers 160 and a liquid crystal material is reduced.

A long axis of an ellipse that is a cross-section of the second spacers 160 is substantially in parallel with a first direction that corresponds to a liquid crystal injection direction so as to reduce a friction between the second spacer 160 and the liquid crystal material. When the long axis is in parallel with a second direction that is substantially perpendicular to the first direction, the friction between the second spacers 160 and the liquid crystal material increases.

According to the present embodiment, each of the second spacers 160 has an elliptical column shape of which long axis is substantially in parallel with the liquid crystal injection direction. Thus, the liquid crystal material may be easily injected into between first and second substrates.

Embodiment 8

Figure 15:
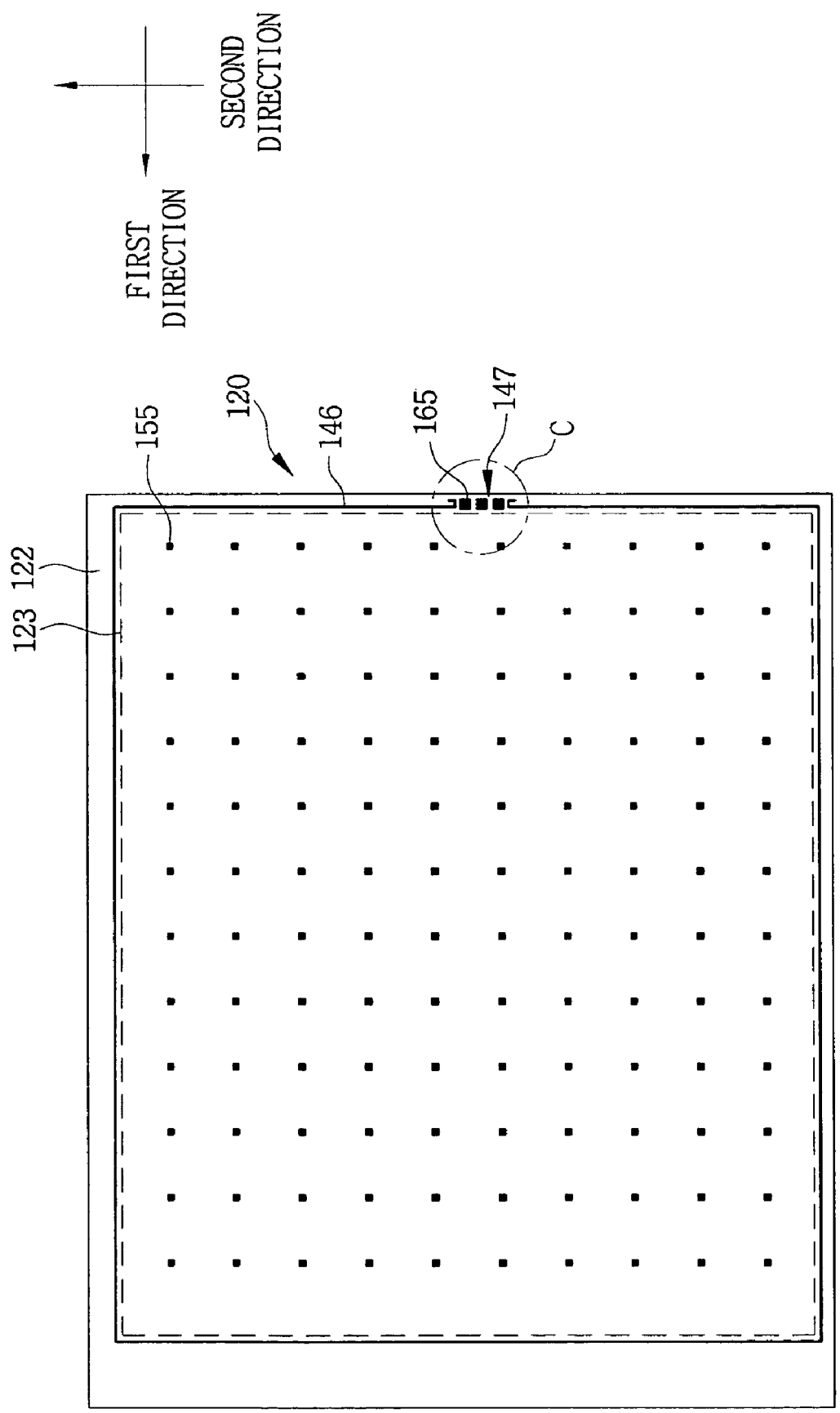
FIG. 15 is a plan view showing first and second spaces formed on a second substrate according to an eighth exemplary embodiment of the present invention.
Figure 16:
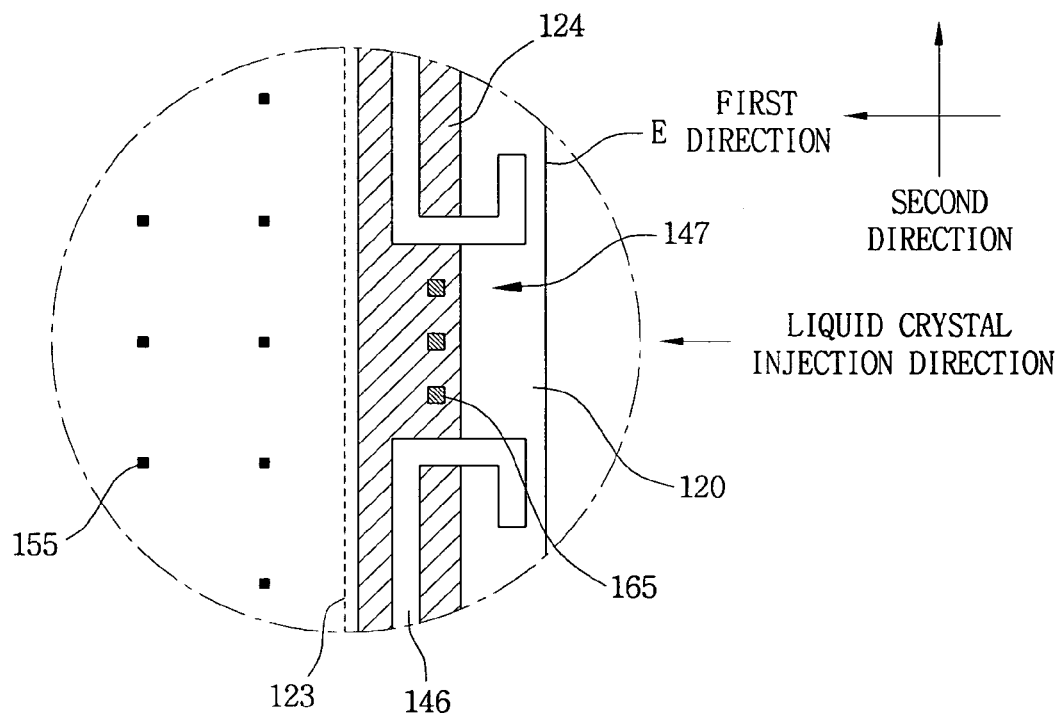
FIG. 16 is a partially enlarged view showing a portion 'C' of FIG. 15.

FIG. 15 is a plan view showing first and second spaces formed on a second substrate according to an eighth exemplary embodiment of the present invention, and FIG. 16 is a partially enlarged view showing a portion 'C' of FIG. 15. The liquid crystal display apparatus is same as in Embodiment 1 except for an arrangement and a shape of second spacers. Thus, the same reference numerals will be used to refer to the same or like parts as those described in Embodiment 2 and any further explanation will be omitted.

Referring to FIGS. 15 and 16, first and second spacers 155 and 165 are formed on a second substrate 120 of a liquid crystal display apparatus. The first spacer 155 is formed in a second region 123, and the second spacer 165 is formed near a liquid crystal inlet 147.

The second spacer 165 is disposed near the liquid crystal inlet 147 so as to prevent a cell gap between first and second substrates from being narrowed (or so as to prevent the liquid crystal inlet 147 from being narrowed).

According to the present embodiment, a plurality of the second spacers 165 is formed in the liquid crystal inlet 147. In detail, when a liquid crystal material is injected in a first direction, the second spacers 165 are disposed in parallel with a second direction that is substantially perpendicular to the first direction.

The second spacers 165 may be disposed between an edge 'E' of the second substrate 120 and the second display part 123. An arrangement of the second spacers 165 is determined according to a force applied to the first substrate 110 or the second substrate 120.

According to the present embodiment, the second spacers 165 are larger than the first spacers 155 in volume, and the second spacers 165 are denser than the first spacers 155 (or a number of the second spacers 165 per unit area is greater than a number of the first spacers 155 per unit area), so that a liquid crystal material may be injected via the liquid crystal inlet 147 easily.

A first distance L1 between the second spacers 165 is in the range from about 1.5 mm to about 2.0 mm. For example, when the first distance L1 is shorter than 1.5 mm, the second spacers 160 may block the liquid crystal material. On the contrary, when the first distance L1 is greater than 2.0 mm, the second spacers 165 may not prevent the liquid crystal inlet 147 from being narrowed. Thus, the liquid crystal material may not be injected easily via the liquid crystal inlet 147.

A second distance L2 between an edge of the liquid crystal inlet 147 and the second spacer 165 is in the range from about 0.5 mm to about 1.5 mm. For example, when the second distance L2 is shorter than 0.5 mm, an apparatus of forming the seal line 146 may not detect an exact position on which the seal line is formed. Thus, the seal line 146 may not be exactly formed. On the contrary, when the second distance L2 is greater than 1.5 mm, a cell gap between the first and second substrates 110 and 120 may be narrowed, so that the liquid crystal material may be easily injected.

In the present embodiment of the present invention, the second spacer 165 is formed on the second substrate 120, such that the liquid crystal material may be easily injected.

Embodiment 9

Figure 17:
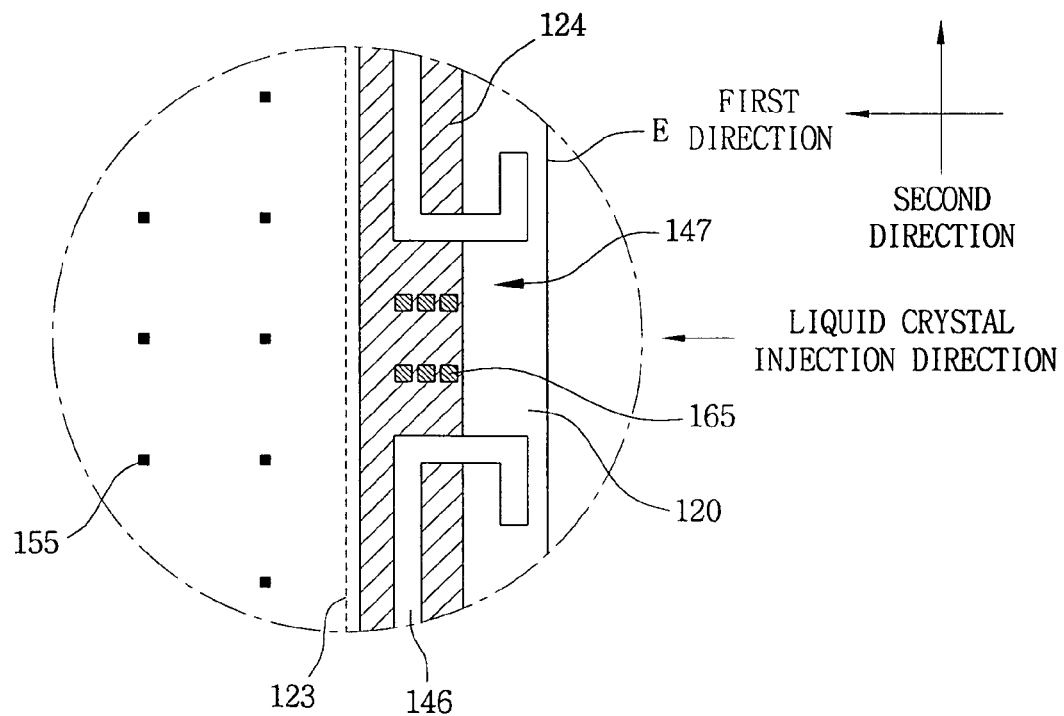
FIG. 17 is an enlarged view showing a second spacer according to a ninth exemplary embodiment of the present invention.

FIG. 17 is an enlarged view showing a second spacer according to a ninth exemplary embodiment of the present invention. The liquid crystal display apparatus is same as in Embodiment 8 except for an arrangement of second spacers. Thus, the same reference numerals will be used to refer to the same or like parts as those described in Embodiment 8 and any further explanation will be omitted.

Referring to FIG. 17, when a liquid crystal material is injected in a first direction, a plurality of second spacers 165 are arranged in the first direction. For example, in the present embodiment, two columns of the second spacers 165 are formed along the second direction. Each of columns includes a plurality of the second spacers 165 in the first direction. Then, the second spacers 165 may support a cell gap formed between the first and second substrates, while the second spacers 165 minimize a blocking a liquid crystal material. Thus, the liquid crystal material may be easily injected via the liquid crystal inlet 147.

According to the present embodiment, a plurality of the second spacers 165 is arranged in an injecting direction of a liquid crystal material. Thus, the second spacers 165 do not block the liquid crystal material, so that the liquid crystal material may be easily injected, while preventing the liquid crystal inlet 147 from being narrowed.

Embodiment 10

Figure 18:
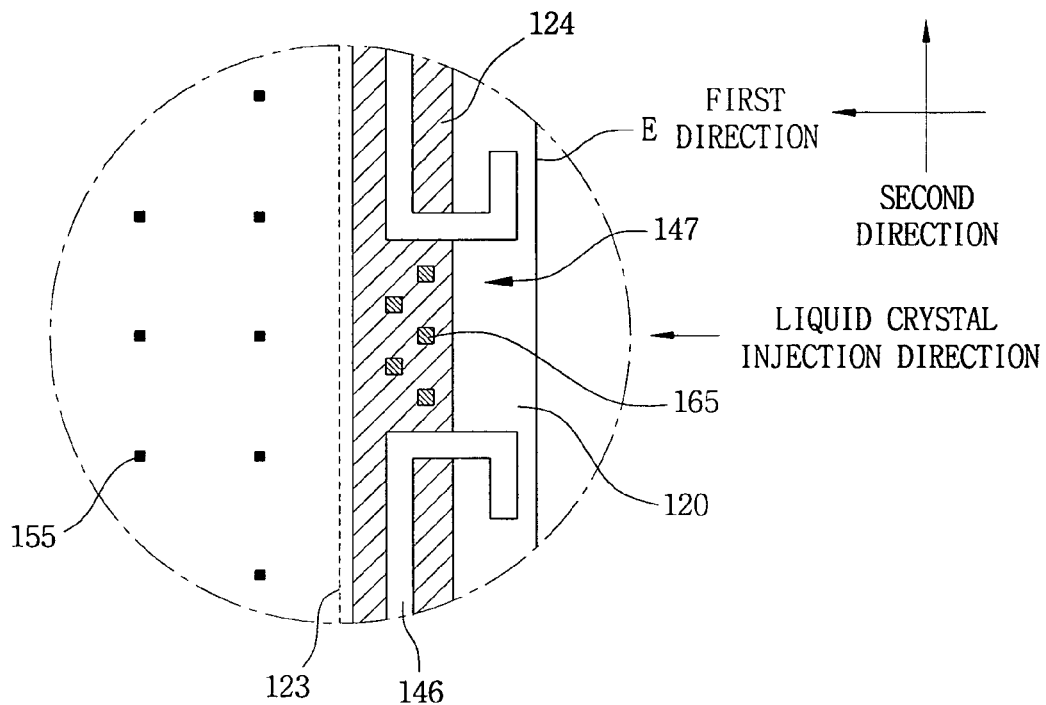
FIG. 18 is an enlarged view showing a second spacer according to a tenth exemplary embodiment of the present invention.

FIG. 18 is an enlarged view showing a second spacer according to a tenth exemplary embodiment of the present invention. The liquid crystal display apparatus is same as in Embodiment 8 except for an arrangement of second spacers. Thus, the same reference numerals will be used to refer to the same or like parts as those described in Embodiment 8 and any further explanation will be omitted.

Referring to FIG. 18, second spacers 165 are arranged in a zigzag form, so that the second spacers 165 maintains a cell gap between first and second substrates, while the second spacers 165 are not blocking a liquid crystal material. Further, the second spacer 165 is disposed widely between the first and second substrates so that even when an excessive force is applied, the second spacer 165 may maintain the cell gap.

According to the present embodiment, a plurality of the second spacers 165 is arranged in a zigzag form in the liquid crystal inlet 147 so as to maintain the cell gap between the first and second substrates. Thus, the liquid crystal material may be easily injected into between the first and second substrates.

Embodiment 11

Figure 19:
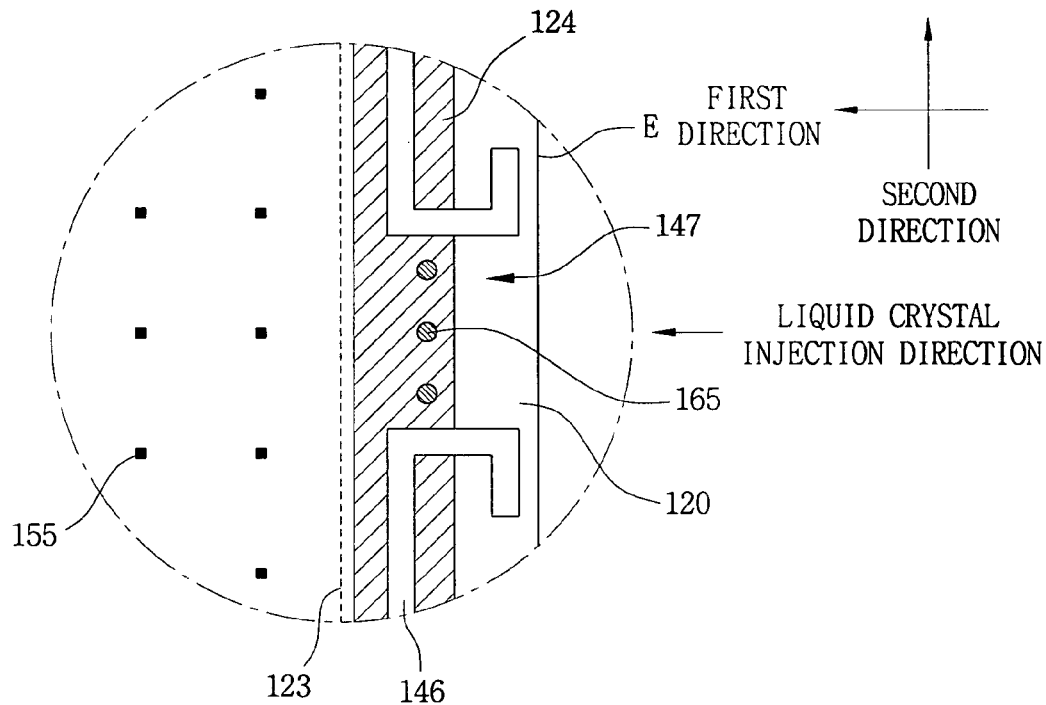
FIG. 19 is an enlarged view showing a second spacer according to an eleventh exemplary embodiment of the present invention.

FIG. 19 is an enlarged view showing a second spacer according to an eleventh exemplary embodiment of the present invention. The liquid crystal display apparatus is same as in Embodiment 8 except for a shape of second spacers. Thus, the same reference numerals will be used to refer to the same or like parts as those described in Embodiment 8 and any further explanation will be omitted.

Referring to FIG. 19, second spacers 165 formed in a liquid crystal inlet 147 have a cylindrical shape. The second spacers 165 may have a truncated cone shape. When the second spacers 165 has the cylindrical shape or the truncated cone shape, a friction between the second spacers 165 and a liquid crystal material that is to be injected into between first and second substrates is reduced. Thus, the liquid crystal may be easily injected, while preventing the liquid crystal inlet 147 from being narrowed.

According to the present embodiment, each of the second spacers 165 has the cylindrical shape or the truncated cone shape, so that the liquid crystal material may be easily injected into between the first and second substrates.

Embodiment 12

Figure 20:
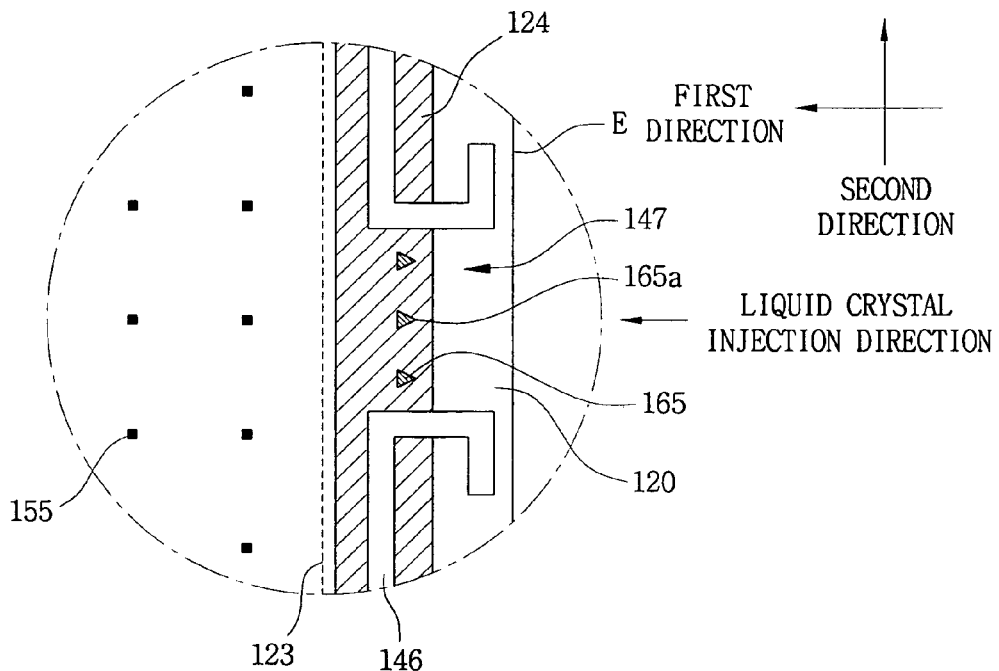
FIG. 20 is an enlarged view showing a second spacer according to a twelfth exemplary embodiment of the present invention.

FIG. 20 is an enlarged view showing a second spacer according to a twelfth exemplary embodiment of the present invention. The liquid crystal display apparatus is same as in Embodiment 8 except for a shape of second spacers. Thus, the same reference numerals will be used to refer to the same or like parts as those described in Embodiment 8 and any further explanation will be omitted.

Referring to FIG. 20, second spacers 165 formed in a liquid crystal inlet 147 has a triangular prism shape, such that an edge of the triangular prism extends outward. Thus, a liquid crystal material may be injected easily via a liquid crystal inlet 147, because a friction between the second spacers 165 and the liquid crystal material is reduced.

However, the friction between the second spacers 165 and the liquid crystal material increases, when the liquid crystal material flows out. Thus, the second spacers 165 prevent the liquid crystal material from being leaked.

According to the present embodiment, the second spacers 165 have a triangular shape of which edge faces an injection direction of a liquid crystal molecule. Thus, a friction between the liquid crystal material and the second spacers 165 is reduced.

Embodiment 13

Figure 21:
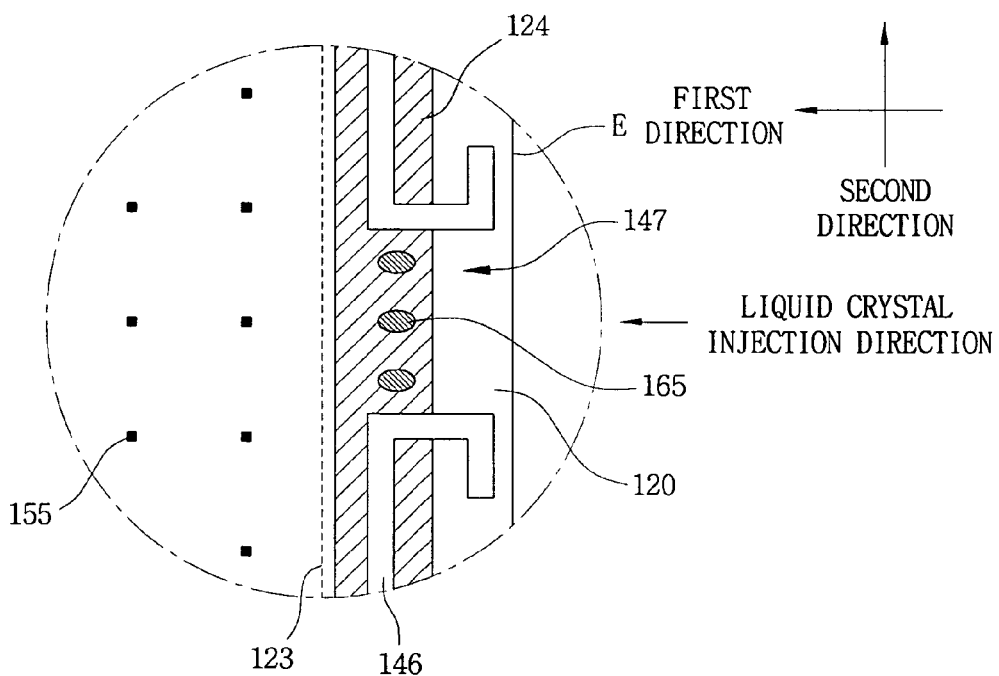
FIG. 21 is an enlarged view showing a second spacer according to a thirteenth exemplary embodiment of the present invention.

FIG. 21 is an enlarged view showing a second spacer according to a thirteenth exemplary embodiment of the present invention. The liquid crystal display apparatus is same as in Embodiment 8 except for a shape of second spacers. Thus, the same reference numerals will be used to refer to the same or like parts as those described in Embodiment 8 and any further explanation will be omitted.

Referring to FIGS. 21, second spacers 165 formed in a liquid crystal inlet 147 have an elliptical column shape, so that a friction between the second spacers 165 and a liquid crystal material is reduced.

A long axis of an ellipse that is a cross-section of the second spacers 165 is substantially in parallel with a first direction that corresponds to a liquid crystal injection direction, so as to reduce a friction between the second spacer 165 and the liquid crystal material. When the long axis is in parallel with a second direction that is substantially perpendicular to the first direction, the friction between the second spacers 165 and the liquid crystal material increases.

According to the present embodiment, each of the second spacers 165 has an elliptical column shape of which long axis is substantially in parallel with the liquid crystal injection direction. Thus, the liquid crystal material may be easily injected into between first and second substrates.

Embodiment 14

Figure 22:
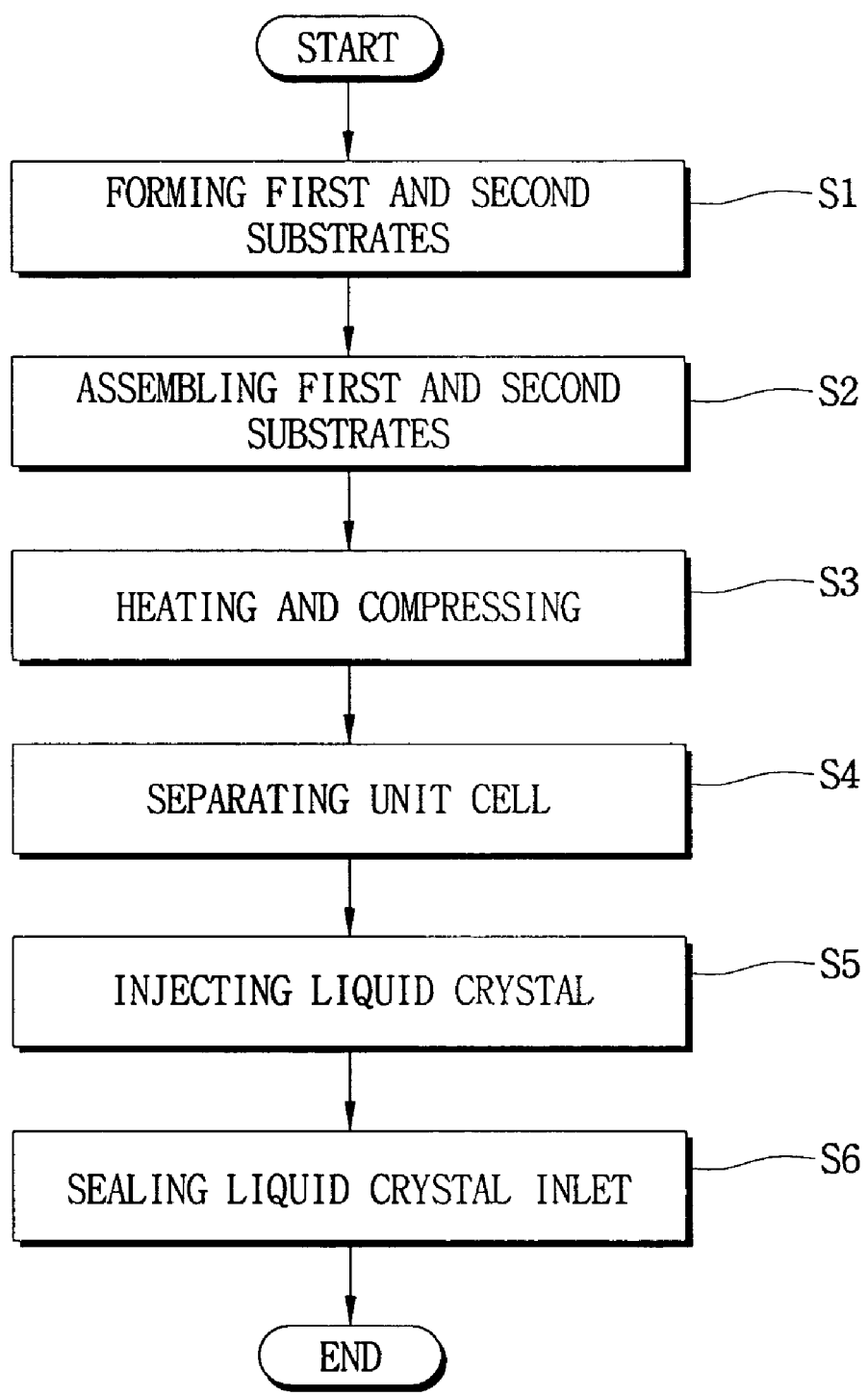
FIG. 22 is a flow chart showing a method of manufacturing the liquid crystal display panel of FIG. 1 according to a fourteenth exemplary embodiment of the present invention.

FIG. 22 is a flow chart showing a method of manufacturing the liquid crystal display panel of FIG. 1 according to a fourteenth exemplary embodiment of the present invention. Hereinafter, a method of manufacturing a liquid crystal display apparatus is explained.

Referring to FIG. 22, in order to manufacture a liquid crystal display panel, a first substrate having a plurality of pixels and a second substrate having color filters are formed (step S1).

Figure 23:
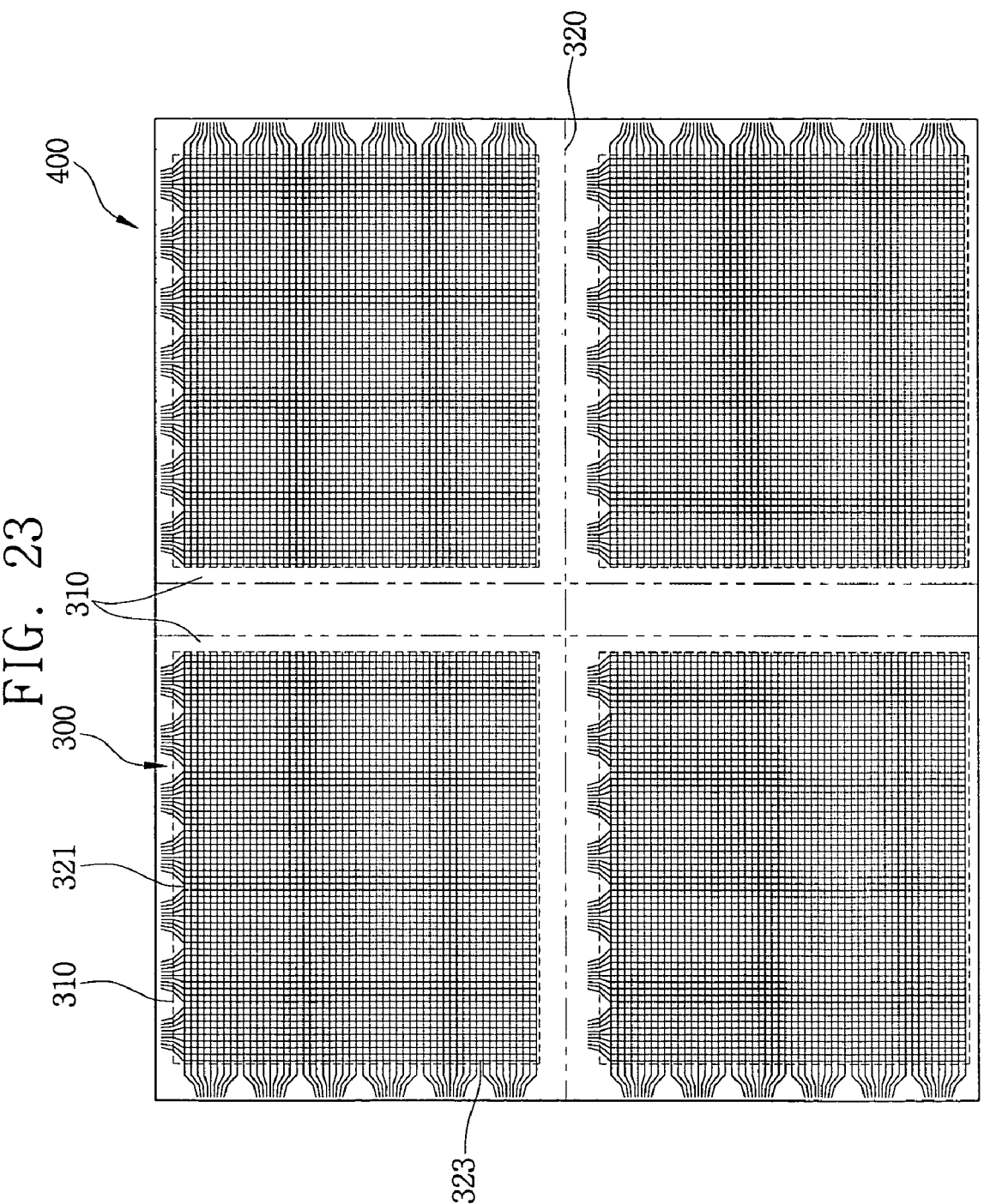
FIG. 23 is a plan view showing a process of manufacturing the first substrate of FIG. 22.
Figure 24:
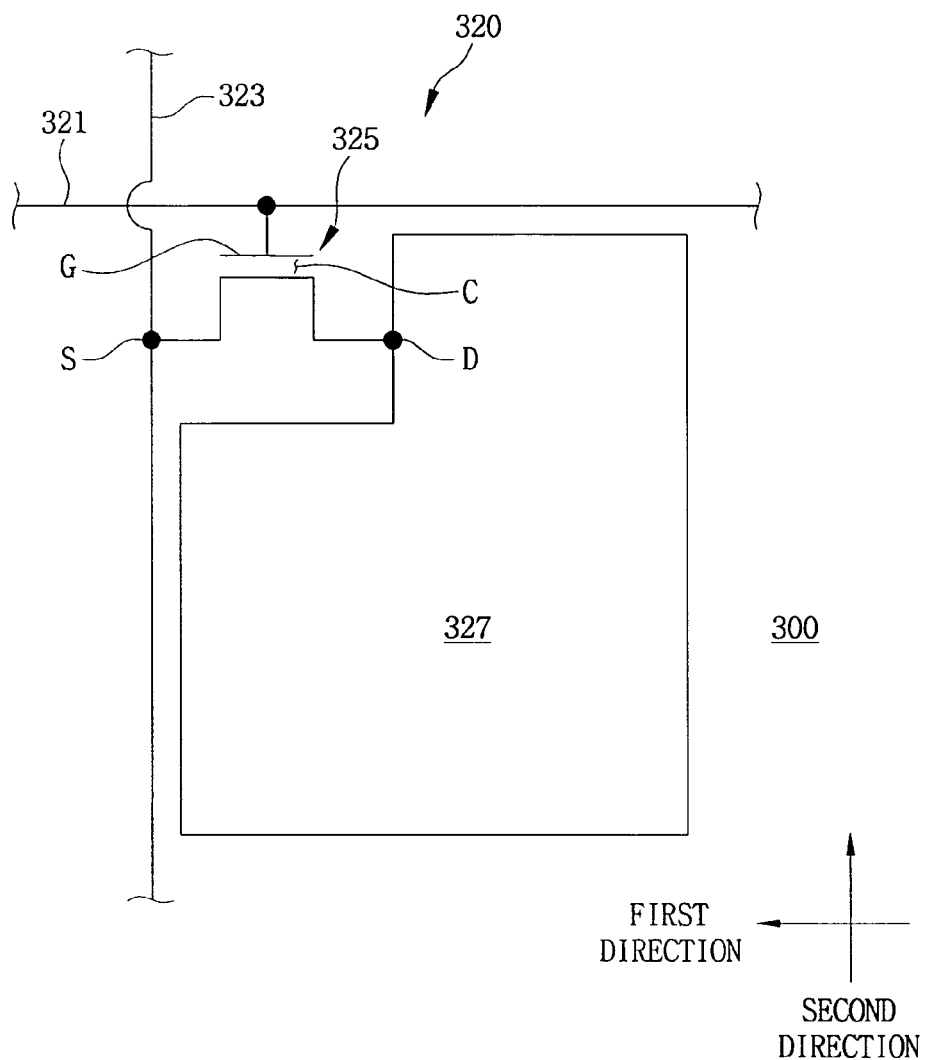
FIG. 24 is a schematic view showing a unit pixel of a liquid crystal display panel of FIG. 23.

FIG. 23 is a plan view showing a process of manufacturing the first substrate of FIG. 22. FIG. 24 is a schematic view showing a unit pixel of a liquid crystal display panel of FIG. 23, and FIG. 25 is a cross-sectional view showing a thin film transistor and a pixel electrode formed on the first substrate of FIG. 23.

Referring to FIG. 23, a plurality of first substrates 300 is formed on a first mother substrate 400 so as to enhance productivity.

Figure 25:
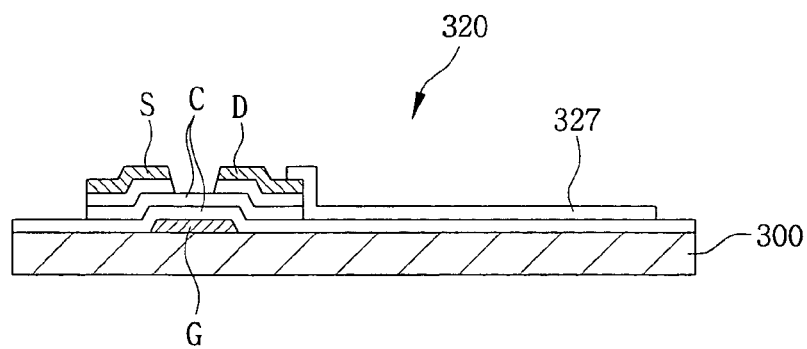
FIG. 25 is a cross-sectional view showing a thin film transistor and a pixel electrode formed on the first substrate of FIG. 23.

Referring to FIGS. 23 to 25, each of the first substrate 300 includes a plurality of pixels 320 arranged in a matrix shape. The pixels 320 are formed in a first display part 310. For example, when a liquid crystal display apparatus has a resolution is 1024×768, and displays a full color, 1024×763×3 number of pixels 320 are formed on the first display part 310.

Referring to FIGS. 24 and 25, each of the pixels 320 includes a gate line 321, a data line 323, a thin film transistor 325 and a pixel electrode 327. The gate line 321 extends in a first direction. 768 number of gate lines are arranged in parallel. The gate line 321 comprises a material that has good electric property, for example, such as aluminum or aluminum alloy.

The data line 323 is insulated from the gate line 321. The data line 323 extends in a second direction that is substantially perpendicular to the first direction. 1024×3 number of data lines 323 are arranged in parallel. The data line 323 also comprises a material that has a good electric property, for example, such as aluminum or aluminum alloy.

The thin film transistor 325 is electrically connected to the gate line 321 and the data line 323. The thin film transistor 325 includes a gate electrode G, a source electrode S, a channel layer C and a drain electrode D.

The gate line 321 that extends in the first direction protrudes in the second direction to form the gate electrode G. 1024×3 number of gate electrodes G are formed spaced apart per gate line.

The channel layer C is formed on the gate electrode G, such that the electrically insulated from the gate electrode G. The channel layer comprises amorphous silicon or n+ amorphous silicon having dopants.

The source electrode S is electrically connected to the data line 323. 768 number of source electrodes are formed per data line 323. The source electrode S is formed on the channel layer C.

The drain electrode D is electrically insulated from the source electrode S. The drain electrode D is also formed on the channel layer C.

The pixel electrode 327 comprises a material that is optically transparent and electrically conductive, such as indium tin oxide (ITO) and indium zinc oxide (IZO).

The pixel electrode 327 is formed on a pixel region defined by the gate line 321 and the data line 323. The pixel electrode 327 is electrically connected to the drain electrode D of the thin film transistor 325.

Figure 26:
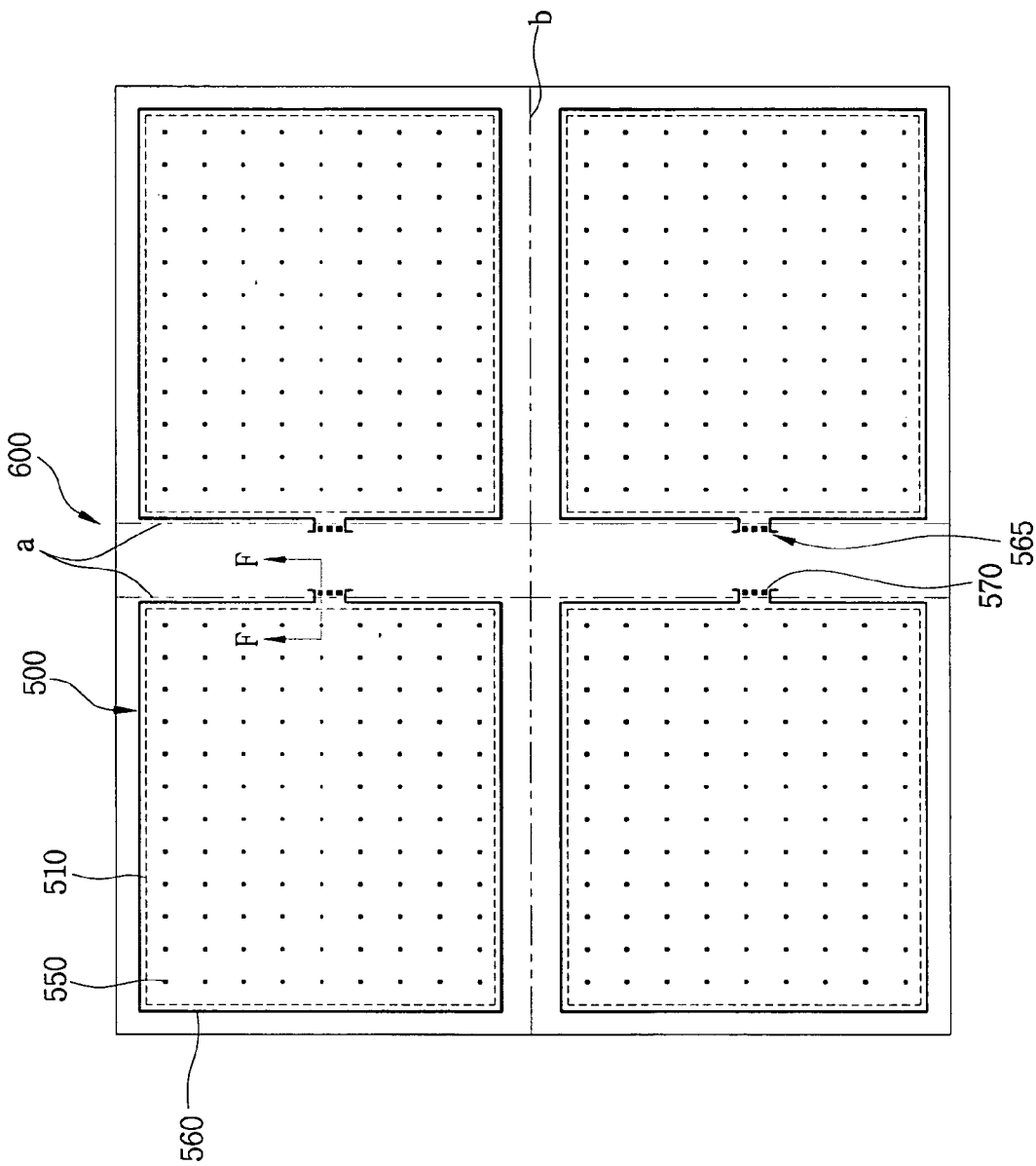
FIG. 26 is a plan view showing a process of manufacturing the second substrate of FIG. 22.
Figure 27:
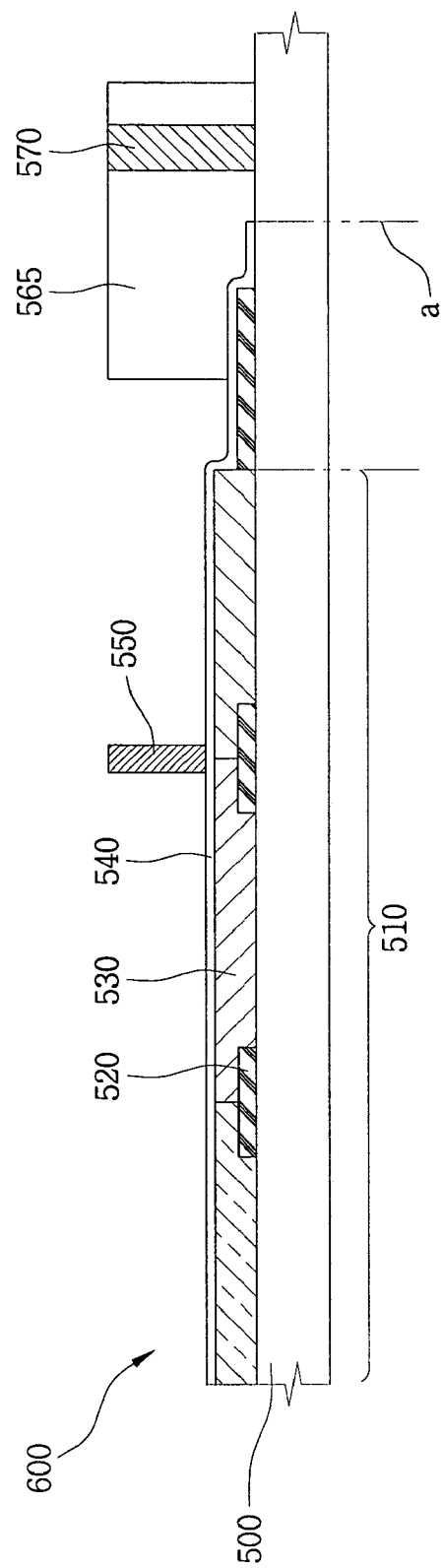
FIG. 27 is a cross-sectional view taken along the line F–F'' of FIG. 26.

FIG. 26 is a plan view showing a process of manufacturing the second substrate of FIG. 22. FIG. 27 is a cross-sectional view taken along the line F–F' of FIG. 26.

Referring to FIGS. 26 and 27, a plurality of second substrates 500 is formed on a second mother substrate 600 so as to enhance productivity.

Each of the second substrate 500 includes a second display part 510 for displaying an image. The second display part 510 has substantially same area as the first display part 310 of the first substrate 300. The second display part 510 faces the fist display region 310. The second display part 510 includes a light blocking layer 520, a color filter 530, a common electrode 540 and a first spacer 550. A seal line 560 and a second spacer 570 are formed on the second substrate 500 outside of the second display part 510.

The light blocking layer 520 comprises a metal such as chromium (Cr) or chromium oxide ($CrO_2$), or an organic material. The light blocking layer 520 has opening corresponding to the pixel electrode 327 of the first substrate 300. Thus, the light blocking layer 520 allows a first light that penetrates the pixel electrode 327 to pass through via the opening, and the light blocking layer 520 blocks a second light that penetrate between the pixel electrodes 327 so as to enhance a display quality. A portion of the light blocking layer 520 is formed a band shape along an edge of the second display part 510.

The color filter 530 is formed on the second substrate 500, such that the color filter 530 faces the pixel electrode 327. The color filter 530 includes a red color filter, a green color filter and a blue color filter. The red color filter allows only a light that has a wavelength corresponding to a red color to pass through the red color filter. The green color filter allows only a light that has a wavelength corresponding to a green color to pass through the green color filter. The blue color filter allows only a light that has a wavelength corresponding to a blue color to pass through the blue color filter.

The common electrode 540 is formed on the color filter 530 covering all region of the second substrate 500. The common electrode 540 comprises a material that is optically transparent and electrically conductive, such as indium tin oxide (ITO) and indium zinc oxide (IZO).

An organic layer comprising an organic material is patterned to form a plurality of the first spacers 550 on the common electrode 540.

The seal line 560 comprises a thermosetting material and adhesive. The seal line 560 combines the first and second substrates 300 and 500. Further, the seal line 5600 confines the liquid crystal material. The seal line 560 also forms a cell gap that corresponds to a distance between the first and second substrates 300 and 500.

The seal line 560 surrounds the first display part 310 or the second display part 510. However, the seal line 560 does not form a closed curve. That is, the seal line 560 has an opening that corresponds to a liquid crystal inlet 565. A width of the liquid crystal 565 inlet is in the range from about 11 mm to about 20 mm.

The organic layer comprising the organic material is patterned to form the second spacers 570 at a circumference of the liquid crystal inlet 565. The second spacer 570 is disposed outside of cutting line 'a'. The second spacer 570 may be on the cutting line 'a' or inside of the cutting line 'a'.

The second spacer 570 is formed simultaneously with the first spacer 550. The second spacer 570 prevents the cell gap of the liquid crystal inlet 565 from being narrowed.

The first spacer 550, the seal line 560 and the second spacer 570 may be formed on the first substrate 300.

Referring again to FIG. 22, when the first and second substrates 300 and 500 including the first and second display parts 310 and 510 respectively are formed in step S1, the first and second substrates 300 and 500 are aligned such that the first and second display parts 310 and 510 may face with each other. Then, the first and second substrates 300 and 500 are assembled together instep S2).

When the first and second display parts 310 and 510 are exactly aligned, a color filter 530 is disposed over a pixel electrode 327. The light blocking layer 520 is disposed over the data line 321 and the data line 323, and the first spacers 550 are disposed between the pixels 320.

Then, the first and second mother substrates 400 and 600 are heated and compressed, so that the first and second mother substrates 400 and 600 are combined together instep S3).

When the first and second mother substrates 400 and 600 are heated and compressed, the first spacers 550 disposed in the first and second display parts 310 and 510 maintain a cell gap between the first and second substrates 300 and 500, and the second spacers 570 prevent a cell gap of the liquid crystal inlet 565 from being narrowed.

A seal line 560 between the first and second mother substrates 400 and 600 is hardened, so that the first and second mother substrates 400 and 600 are combined with each other. Hereinafter, the first and second substrates 300 and 500 combined with each other will be referred to as a unit cell 700.

Then, the unit cell 700 are separated from the first and second mother substrates 400 and 600 by cutting a cutting lines 'a' and 'b' of the first and second mother substrates 400 and 600 (step S4).

Figure 28:
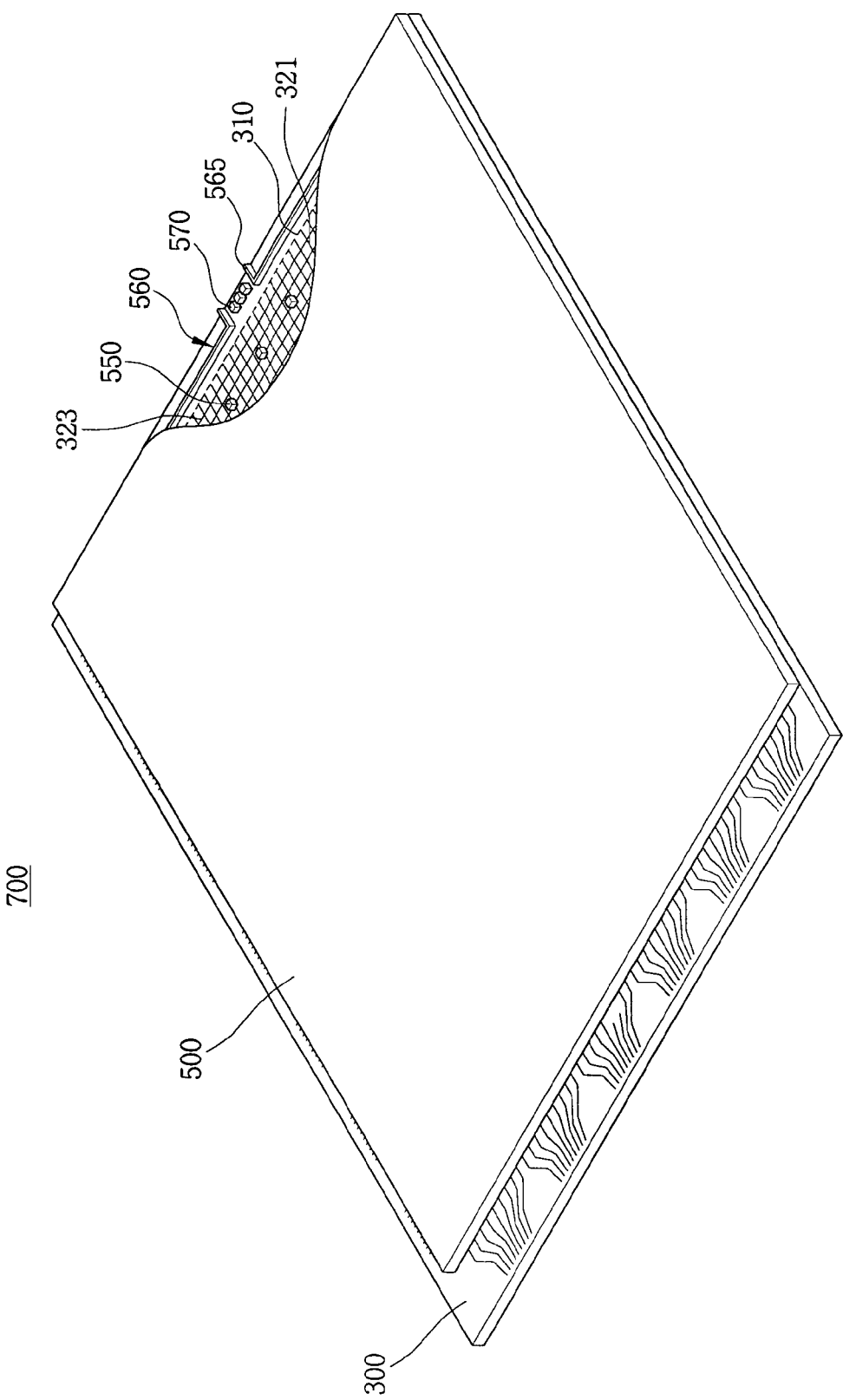
FIG. 28 is a partially cut out perspective view showing a unit cell that is separated from a mother substrate according to a fourth step of FIG. 22.

FIG. 28 is a partially cut out perspective view showing a unit cell that is separated from a mother substrate according to a fourth step of FIG. 22.

When the unit cell is separated from the first and second mother substrates, the second spacer that is formed outside of the cutting line 'a' remains at the first and second mother substrates, but the second spacer 570 that is formed inside of the cutting line 'a' remains at the unit cell as shown in FIG. 28.

Referring to FIGS. 22 and 28, when the unit cell 700 is separated from the first and second mother substrates (step S4), the liquid crystal inlet 565 is dipped in a liquid crystal material in a chamber having vacuum pressure. Then, the pressure of the chamber increases, so that the liquid crystal material flows into the unit cell 700 (step S5).

The second spacer 570 maintains the cell gap. When the second spacer 570 is formed outside of the cutting line 'a', the second spacer is not formed at the unit cell 700. Thus, the unit cell does not block the liquid crystal material that flows into the unit cell 700 via the liquid crystal inlet 565. In case that the second spacer 570 is formed inside of the cutting line 'a', a friction between the second spacer that is one of the previous embodiments and the liquid crystal material is minimized, so that the liquid crystal material is injected into the unit cell 700 easily.

When the liquid crystal material is filled completely, a sealing member seals the liquid crystal inlet 565, so that the liquid crystal material may not flow out via the liquid crystal inlet 565. Thus, a liquid crystal display panel 800 is formed (step S6).

The sealing member comprises a material that is hardened when an ultraviolet light is irradiated onto the material. Thus, the sealing member is hardened, when the ultraviolet light is irradiated onto the seal member.

According to the present embodiment, the first spacer 550 is formed in the first and second display parts 310 and 510. The second spacer 570 is formed outside or inside of the cutting line 'a' so as to maintain the cell gap of the liquid crystal inlet in assembling the first and second mother substrates. Thus, the second spacer 570 does not block the liquid crystal material that flows into the unit cell, or a friction between the second spacer 570 and the liquid crystal material is minimized, so that the liquid crystal material is injected easily. Thus, the liquid crystal material is completely filled to enhance the display quality.

Embodiment 15

Figure 29:
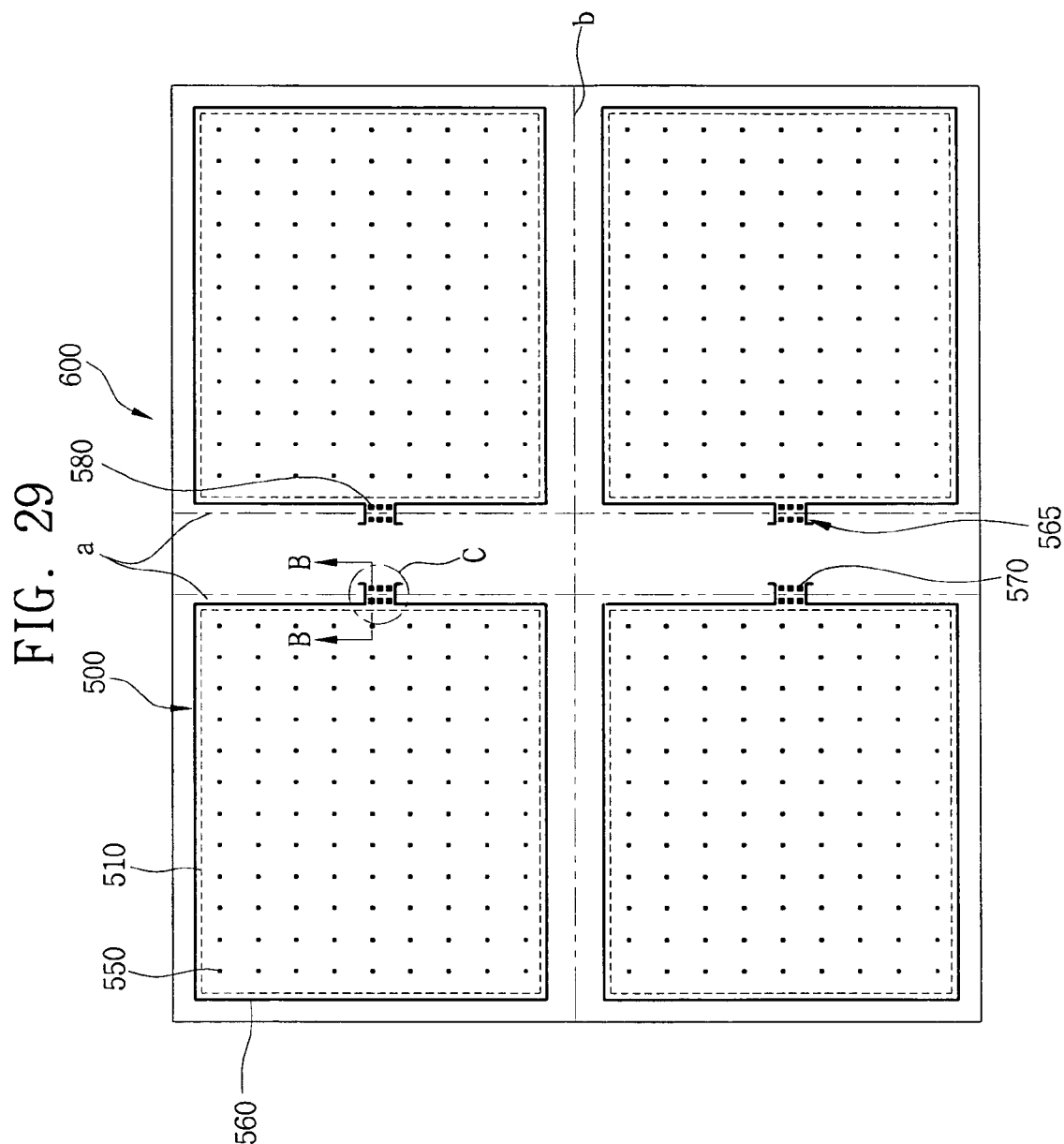
FIG. 29 is a plan view showing first, second and third spacers formed on a second substrate according to a fifteenth exemplary embodiment of the present invention.
Figure 30:
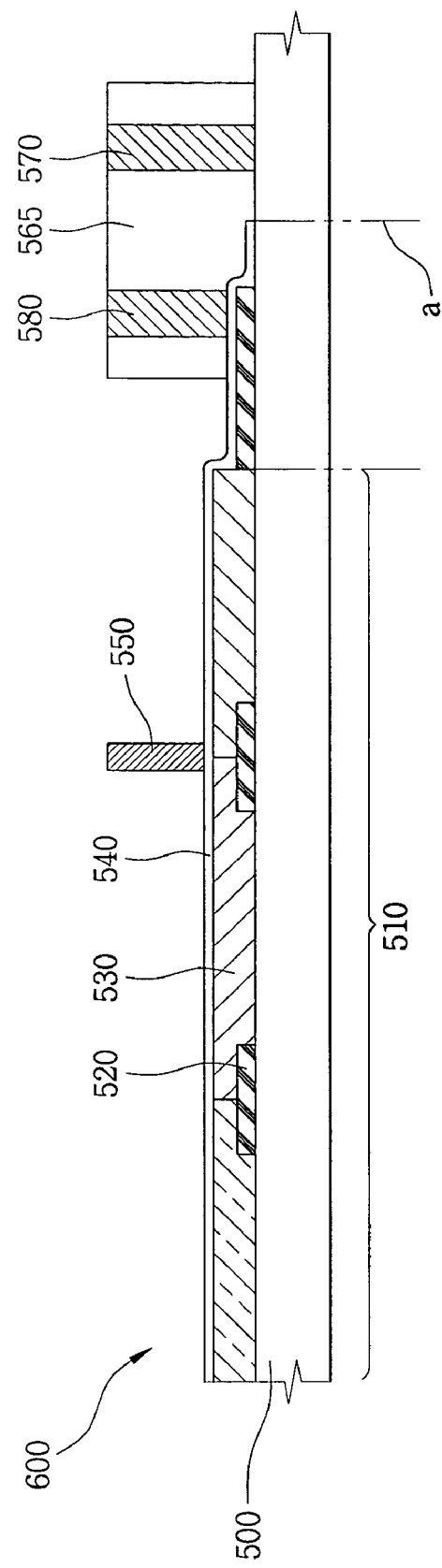
FIG. 30 is a cross-sectional view taken along the line G–G'.

FIG. 29 is a plan view showing first, second and third spacers formed on a second substrate according to a fifteenth exemplary embodiment of the present invention, and FIG. 30 is a cross-sectional view taken along the line G–G'. The liquid crystal display apparatus is same as in Embodiment 1 except for a third spacer. Thus, the same reference numerals will be used to refer to the same or like parts as those described in Embodiment 1 and any further explanation will be omitted.

Referring to FIGS. 29 and 30, first, second and third spacers 550, 570 and 580 are formed on the second substrate 500. The first spacer 550 is formed inside of a second display part 510. The second and third spacers 570 and 580 are formed near a liquid crystal inlet 565.

The second spacer 570 is formed on a cutting line 'a', or outside of the cutting line 'a'. The third spacer 580 is formed inside of the cutting line 'a' that passes the liquid crystal inlet 565. The first, second and third spacers 550, 570 and 580 are formed simultaneously. The second and third spacers 570 and 580 prevent the cell gap of the liquid crystal inlet from being narrowed.

Figure 31:
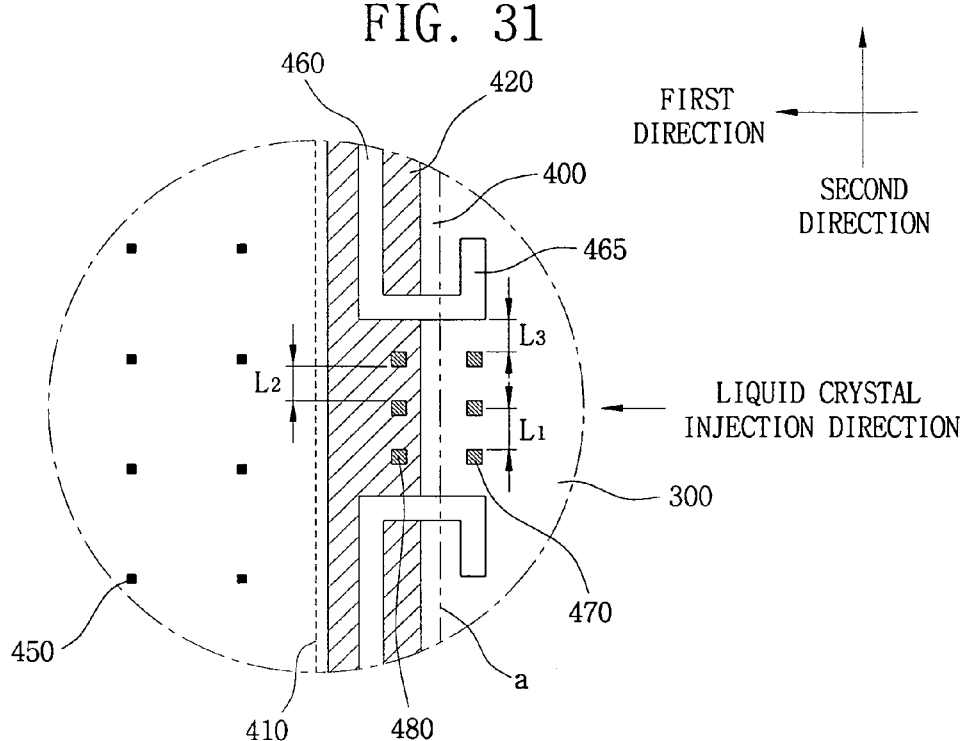
FIG. 31 is an enlarged view showing the second and third spacers of FIG. 29.

FIG. 31 is an enlarged view showing the second and third spacers of FIG. 29.

Referring to FIG. 31, when a liquid crystal material is injected in a first direction, second and third spacers 570 and 580 are disposed in a second direction that is substantially perpendicular to the first direction. The second and third spacers 570 and 580 are parallel with each other in the first direction. A force applied to the first and second substrates 300 and 600 determines an arrangement of the second and third spacers 570 and 580.

In the present embodiment, the second and third spacers 570 and 580 are larger than the first spacer 550 in volume, and the second and third spacers 570 and 580 are sparser than the first spacer 550 (or a number of the second and third spacers 570 and 580 per unit area is smaller than a number of the first spacer 550 per unit area), or the second and third spacers 570 and 580 are smaller than the first spacer 550 in volume, and the second and third spacers 570 and 580 are denser than the first spacer 550 (or a number of the second and third spacers 570 and 580 per unit area is greater than a number of the first spacer 550 per unit area). The number of the second spacer 570 is same as the number of the third spacer 580.

Thus, a young's modulus of the first spacer 550 and a young's modulus of the second and third spacers 570 and 580 are substantially same with each other, so that a cell gap is maintained uniform during a process of heating and compressing so as to combine the first and second mother substrates.

In the present embodiment, a first distance L1 between the second spacers 570, and a second distance between the third spacers 580 are in the range from about 1.0 mm to about 3.0 mm. When the first and second distance L1 and L2 are smaller than 1.0 mm, the second and third spacer 570 and 580 may block a liquid crystal material that flows into between the first and second substrates. On the contrary, when first and second distances L1 and L2 are longer than 3.0 mm, a uniformity of the cell gap of the liquid crystal inlet 565 is lowered. Thus, the liquid crystal material may not be easily injected.

A third distance L3 between the second spacer 570 and an edge of the liquid crystal inlet 565 or between the third spacer 580 and the edge of the liquid crystal inlet 565 is in the range from about 1.5 mm to about 3.0 mm. When the third distance L3 is shorter than 1.5 mm, an apparatus of forming the seal line 560 may not detect an exact position on which the seal line 560 is formed. Thus, the seal line 560 may not be exactly formed. On the contrary, when the third distance L3 is greater than 3.0 mm, a uniformity of the cell gap of the liquid crystal inlet 565 is lowered. Thus, the liquid crystal material may not be easily injected.

Each of the second and third spacers 570 and 580 has a rectangular prism.

The first and second mother substrates 400 and 600 having the first and second substrates 300 and 500 respectively are assemble together. Then, the first and second mother substrates 400 and 600 are heated and compressed to be combined with each other.

When the first and second mother substrates 400 and 600 are compressed, the first spacer 550 maintains a cell gap between the first and second substrates 300 and 500, and the second and third spacers 570 and 580 prevent the liquid crystal inlet 565 from being narrowed.

Then, unit cell 700 is separated from the first and second mother substrates 400 and 600 by cutting both of cutting lines 'a' and 'b'. The second spacer 570 formed outside of the cutting line remains at the second mother substrate 600. The third spacer 580 formed inside of the cutting line remains at the liquid crystal inlet 565 of the unit cell 700.

The liquid crystal inlet 565 is dipped in a liquid crystal material in a chamber having vacuum pressure. Then, the pressure of the chamber is enhanced, so that the liquid crystal material is injected into between the first and second substrates 300 and 500.

The second and third spacers 570 and 580 maintain the cell gap of the liquid crystal inlet 565 during the assembling process of the first and second mother substrates. Thus, the liquid crystal material may be injected easily.

When the liquid crystal material is filled completely, a sealing member seals the liquid crystal inlet 565, so that the liquid crystal panel is formed.

According to the present embodiment, the first spacer 550 is formed between the first and second display parts 310 and 510, and the second and third spacers 570 and 580 are formed outside and inside of the cutting line 'a' respectively, so as to maintain the cell gap of the liquid crystal inlet uniformly. Thus, the uniformity of the cell gap is enhanced.

Embodiment 16

Figure 32:
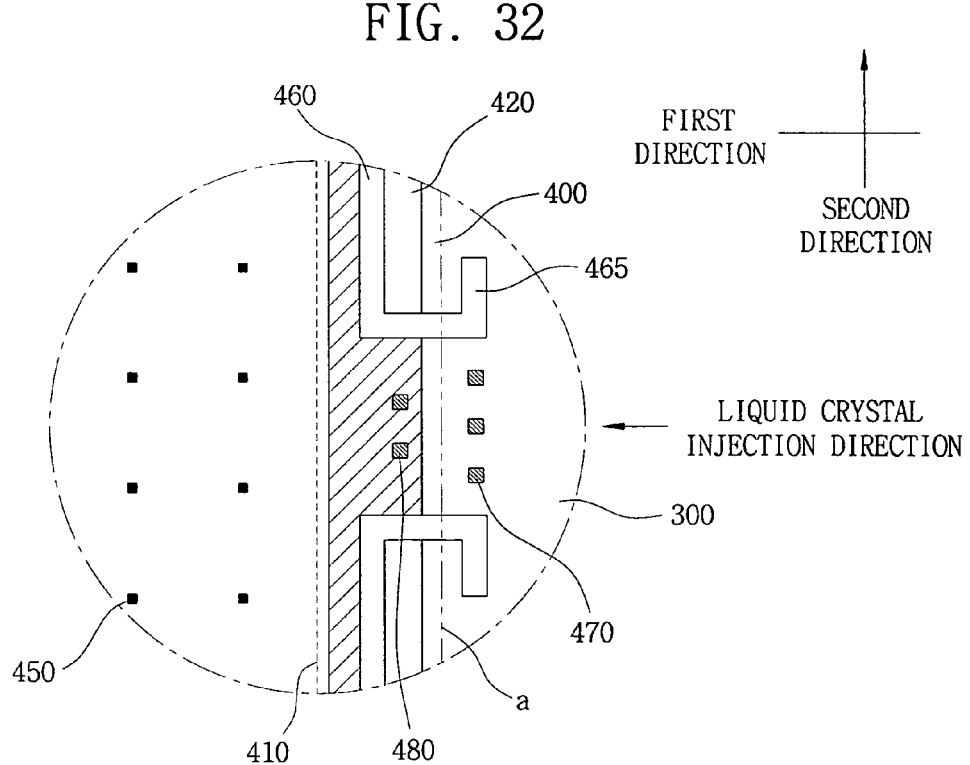
FIG. 32 is an enlarged view showing second and third spacers according to a sixteenth exemplary embodiment of the present invention.

FIG. 32 is an enlarged view showing second and third spacers according to a sixteenth exemplary embodiment of the present invention. The liquid crystal display apparatus is same as in Embodiment 15 except for an arrangement of the third spacers. Thus, the same reference numerals will be used to refer to the same or like parts as those described in Embodiment 15 and any further explanation will be omitted.

Referring to FIG. 32, a column of second spacers 570 is formed in parallel with a cutting line 'a'. A column of third spacers 580 is spaced apart from the second spacers 570. Each of the third spacers 580 is disposed between the second spacers 570, such that each of the second and third spacers 570 and 580 is disposed to form a zigzag shape. Thus, a liquid crystal material may be easily injected. Further, the second and third spacers 570 and 580 maintain a cell gap, even when the first and second mother substrates are excessively compressed.

According to the present embodiment, the second and third spacers 570 and 580 are disposed to form the zigzag form so as to maintain the cell gap of the liquid crystal inlet 565. Thus, the liquid crystal material sprayed while passing trough between the second spacers 570 may easily pass through between the third spacers 580.

Embodiment 17

Figure 33:
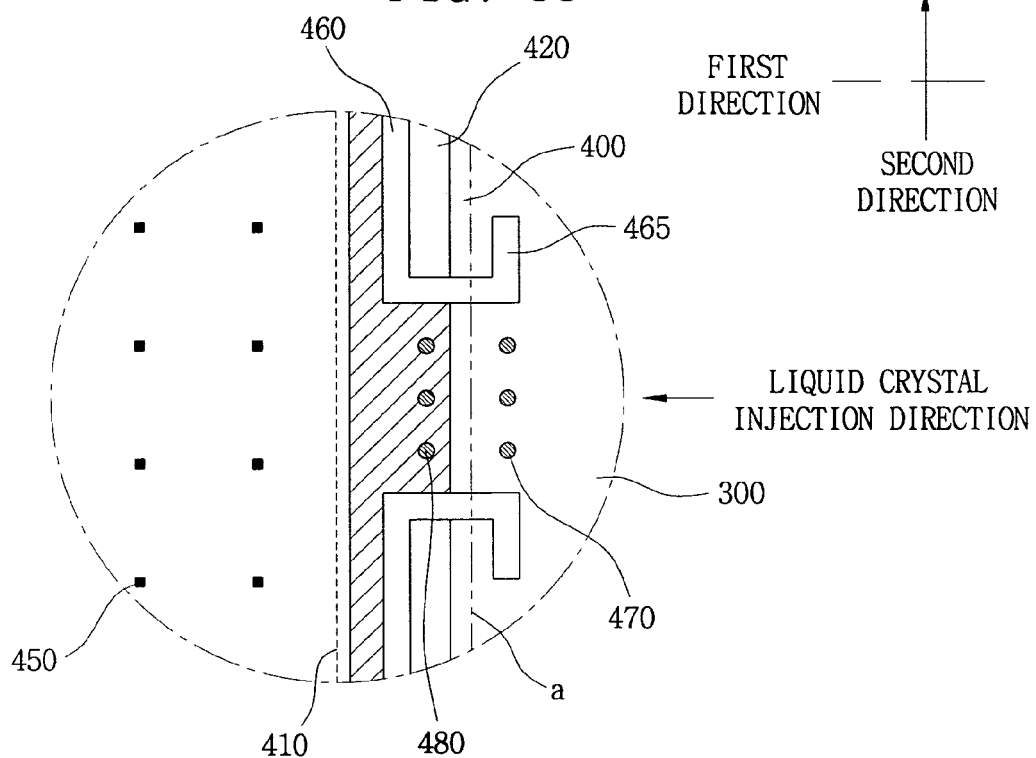
FIG. 33 is an enlarged view showing second and third spacers according to a seventeenth exemplary embodiment of the present invention.

FIG. 33 is an enlarged view showing second and third spacers according to a seventeenth exemplary embodiment of the present invention. The liquid crystal display apparatus is same as in Embodiment 15 except for a shape of third spacers. Thus, the same reference numerals will be used to refer to the same or like parts as those described in Embodiment 15 and any further explanation will be omitted.

Referring to FIG. 33, third spacers 580 disposed inside of a cutting line 'a' has a cylindrical shape. The third spacers 580 may have a truncated cone shape. When the third spacers 580 have the cylindrical shape or the truncated cone shape, a friction between the third spacers 580 and a liquid crystal material that is to be injected into between first and second substrates is reduced. Thus, the liquid crystal may be easily injected, while preventing the liquid crystal inlet 565 from being narrowed.

A second spacer 570 disposed outside of the cutting line 'a' may have an arbitrary shape. When a unit cell is separated from the first and second mother substrates, the second spacer 570 is not disposed in the unit cell. Then, a liquid crystal material is injected. Thus, a shape of the second spacer 570 does not have any effect on injection of the liquid crystal material.

According to the present embodiment, each of the third spacers 160 has the cylindrical shape, or the truncated cone shape, so that the liquid crystal material may be easily injected into between the first and second substrates.

Embodiment 18

Figure 34:
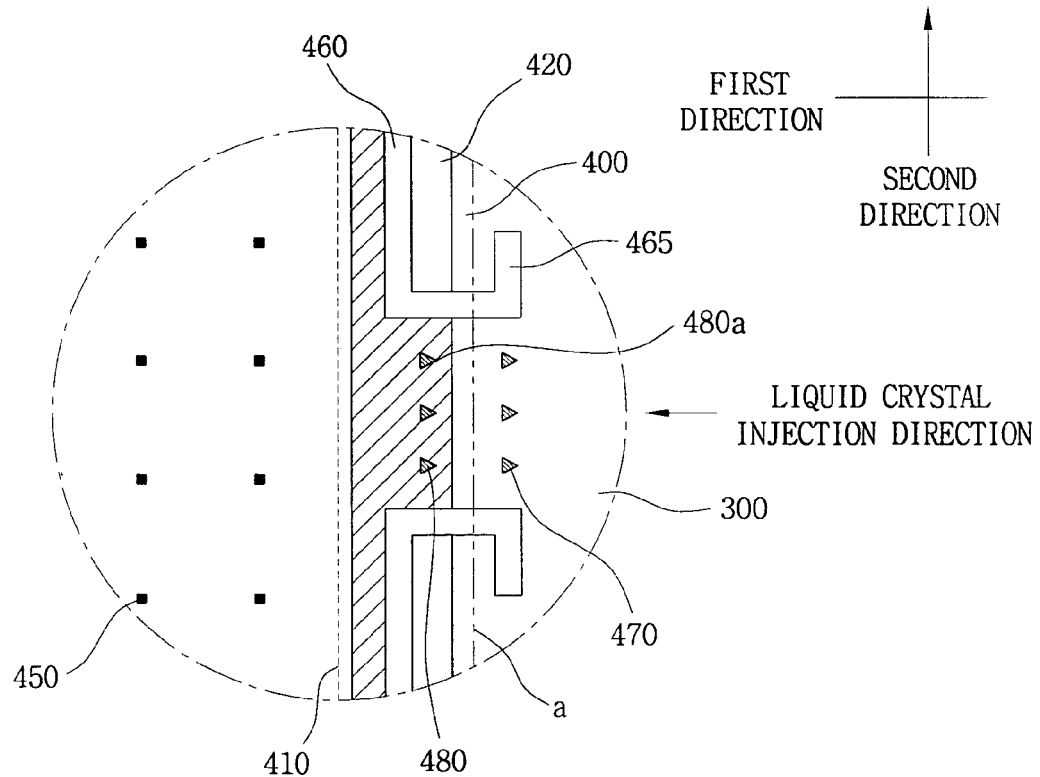
FIG. 34 is an enlarged view showing second and third spacers according to an eighteenth exemplary embodiment of the present invention.

FIG. 34 is an enlarged view showing second and third spacers according to an eighteenth exemplary embodiment of the present invention. The liquid crystal display apparatus is same as in Embodiment 15 except for a shape of third spacers. Thus, the same reference numerals will be used to refer to the same or like parts as those described in Embodiment 15 and any further explanation will be omitted.

Referring to FIG. 34, third spacers 580 disposed inside of a cutting line 'a' has a triangular prism shape. An edge of the triangular prism extends outward. Thus, a liquid crystal material may be injected easily via a liquid crystal inlet 565 because a friction between the third spacers 580 and the liquid crystal material is reduced.

However, the friction between the third spacers 580 and the liquid crystal material increases when the liquid crystal material flows out. Thus, the third spacers 580 prevent the liquid crystal material from being leaked.

A second spacer 570 disposed outside of the cutting line 'a' may have an arbitrary shape. When a unit cell is separated from the first and second mother substrates, the second spacer 570 is not disposed in the unit cell. Then, a liquid crystal material is injected. Thus, a shape of the second spacer 570 does not have any effect on injection of the liquid crystal material.

According to the present embodiment, the third spacers 580 have a triangular shape of which edge faces an injection direction of a liquid crystal molecule. Thus, a friction between the liquid crystal material and the third spacers 580 is reduced.

Embodiment 19

Figure 35:
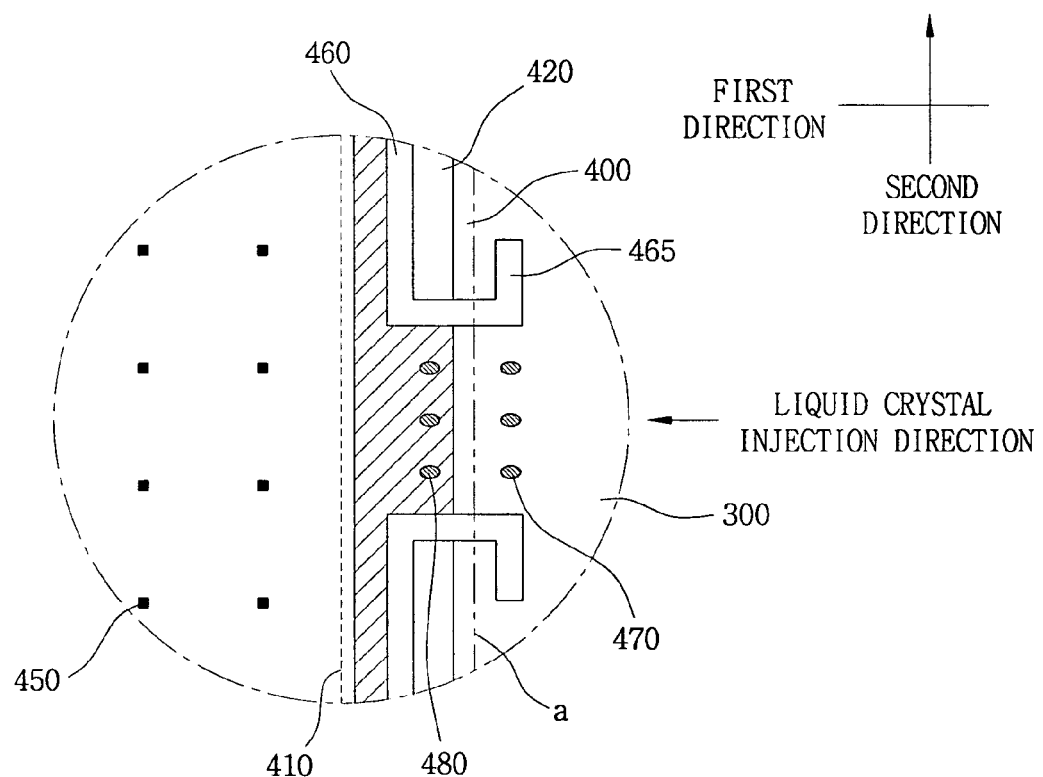
FIG. 35 is an enlarged view showing second and third spacers according to a nineteenth exemplary embodiment of the present invention.

FIG. 35 is an enlarged view showing second and third spacers according to a nineteenth exemplary embodiment of the present invention. The liquid crystal display apparatus is same as in Embodiment 15 except for a shape of third spacers. Thus, the same reference numerals will be used to refer to the same or like parts as those described in Embodiment 15 and any further explanation will be omitted.

Referring to FIG. 35, third spacers 580 disposed inside of a cutting line 'a' have an elliptical column shape, so that a friction between the third spacers 580 and a liquid crystal material is reduced.

A long axis of an ellipse that is a cross-section of the third spacers 580 is substantially in parallel with a first direction that corresponds to a liquid crystal injection direction so as to reduce a friction between the third spacer 580 and the liquid crystal material. When the long axis is in parallel with a second direction that is substantially perpendicular to the first direction, the friction between the third spacers 580 and the liquid crystal material increases.

A second spacer 570 disposed outside of the cutting line 'a' may have an arbitrary shape. When a unit cell is separated from the first and second mother substrates, the second spacer 570 is not disposed in the unit cell. Then, a liquid crystal material is injected. Thus, a shape of the second spacer 570 does not have any effect on injection of the liquid crystal material.

According to the present embodiment, each of the second spacers 160 has an elliptical column shape of which long axis is substantially in parallel with the liquid crystal injection direction. Thus, the liquid crystal material may be easily injected into between first and second substrates.

Having described the exemplary embodiments of the present invention and its advantages, it is noted that various changes, substitutions and alterations can be made herein without departing from the spirit and scope of the invention as defined by appended claims.

What is claimed is:

1. A liquid crystal display apparatus comprising:
a first substrate including a first display part having a pixel electrode;
a second substrate including a second display part having a common electrode that faces the pixel electrode;
a liquid crystal layer interposed between the first and second substrates;
a seal line including a liquid crystal inlet, the seal line defining the first and second display parts;
a first spacer disposed between the first and second display parts, the first spacer maintaining a cell gap formed between the first and second substrates; and
a second spacer disposed near the liquid crystal inlet, the second spacer maintaining the cell gap,
wherein each of the second spacers has a prism shape or an elliptical column shape, the prism shape having an approximately triangular cross section with three surfaces wherein one of the three surfaces is substantially perpendicular to a liquid crystal injection direction, and the elliptical column shape having an elliptical cross section with a long axis that is parallel to the liquid crystal injection direction.

2. The liquid crystal display apparatus of claim 1, wherein the first and second spacers are formed on the first substrate.

3. The liquid crystal display apparatus of claim 2, wherein a number of the second spacer is plural, and the second spacers are arranged substantially in parallel to a liquid crystal injection direction.

4. The liquid crystal display apparatus of claim 2, wherein a number of the second spacer is plural and the second spacers are arranged in a zigzag form.

5. The liquid crystal display apparatus of claim 1, wherein the seal line is formed on the first substrate.

6. The liquid crystal display apparatus of claim 1, wherein a number of the second space is plural, and the second spacers are arranged in a line.

7. The liquid crystal display apparatus of claim 6, wherein the line is substantially perpendicular to a liquid crystal injection direction.

8. The liquid crystal display apparatus of claim 1, wherein a number of the first spacer is greater than a number of the second spacer, and a supporting force of the first spacer per unit area is substantially same as the supporting force of the second spacer per unit area.

9. The liquid crystal display apparatus of claim 1, further comprising a sealing member that seals the liquid crystal inlet, the sealing member being spaced apart from the second spacer.

10. The liquid crystal display apparatus of claim 9, wherein the sealing member comprises a material that is hardened when an ultraviolet light is irradiated.

11. The liquid crystal display apparatus of claim 1, wherein the first and second spacers are formed on the second substrate.

12. The liquid crystal display apparatus of claim 11, wherein the seal line is formed on the second substrate.

13. The liquid crystal display apparatus of claim 11, wherein a number of the second space is plural, and the second spacers are arranged in a line.

14. The liquid crystal display apparatus of claim 11, wherein the line is substantially perpendicular to a liquid crystal injection direction.

15. The liquid crystal display apparatus of claim 11, wherein a number of the first spacer is greater than a number of the second spacer, and a supporting force of the first spacer per unit area is substantially same as the supporting force of the second spacer per unit area.

16. The liquid crystal display apparatus of claim 11, wherein a width of the liquid crystal inlet is in a range from about 11 mm to about 20 mm, a number of the second spacer is plural, a first distance between the second spacers is in a range from about 1.5 mm to about 2.0 mm, and a second distance between the second spacer and an edge of the liquid crystal inlet is in a range from about 0.5 mm to about 1.5 mm.

17. The liquid crystal display apparatus of claim 11, further comprising a sealing member that seals the liquid crystal inlet, the sealing member being spaced apart from the second spacer.

18. The liquid crystal display apparatus of claim of claim 17, wherein the sealing member comprises a material that is hardened when an ultraviolet light is irradiated.

19. The liquid crystal display apparatus of claim 11, wherein a number of the second spacer is plural and the second spacers are arranged substantially in parallel to a liquid crystal injection direction.

20. The liquid crystal display apparatus of claim 11, wherein a number of the second spacer is plural and the second spacers are arranged in a zigzag form.

21. The liquid crystal display apparatus of claim 11, wherein the second spacer has a cylindrical shape, a triangular prism shape of which an edge facing a liquid crystal injection direction, or an elliptical column shape of which long axis is in parallel the liquid crystal injection direction.

22. A liquid crystal display apparatus comprising:
a first substrate including a first display part having a pixel electrode;
a second substrate including a second display part having a common electrode that faces the pixel electrode;
a liquid crystal layer interposed between the first and second substrates;
a seal line including a liquid crystal inlet, the seal line defining the first and second display parts;
a first spacer disposed between the first and second display parts, the first spacer maintaining a cell gap formed between the first and second substrates; and
a second spacer disposed near the liquid crystal inlet, the second spacer maintaining the cell gap,
wherein a width of the liquid crystal inlet is in a range of about 11 mm to about 20 mm, a number of the second spacer is plural, a first distance between the second spacers is in a range of about 1.5 mm to about 2.0 mm, and a second distance between the second spacer and an edge of the liquid crystal inlet is in a range of about 0.5 mm to about 1.5 mm.

23. A method of manufacturing a liquid crystal display apparatus, comprising:
forming a first display part on a first mother substrate;
forming a second display part on a second mother substrate, such that the second display part faces the first display part;
forming a seal line having a liquid crystal inlet along a boundary of the first display part;
forming first and second spacers on the first display part and outside of the first display part corresponding to the liquid crystal inlet respectively;

assembling the first and second mother substrates together;

separating the first and second display parts from the first and second mother substrates;

injecting a liquid crystal material into between the first and second display parts via the liquid crystal inlet; and sealing the liquid crystal inlet, wherein each of the second spacers has a prism shape or an elliptical column shape, the prism shape having an approximately triangular cross section with three surfaces wherein one of the three surfaces is substantially perpendicular to a liquid crystal injection direction, and the an elliptical column shape having an elliptical cross section with a long axis that is parallel to the liquid crystal injection direction.

24. The method of claim 23, further comprising forming third spacers on the outside of the first display part so as to prevent a cell gap from being narrowed.

25. The method of claim 24, wherein a number of the second spacer and a number of the third spacer are plural respectively, and the second and third spacers are arranged in a line respectively.

26. The method of claim 25, wherein the line is substantially perpendicular to a liquid crystal injection direction.

27. The method of claim 24, wherein a number of the first spacer, a number of the second spacer and a number of the third spacer are plural respectively, the number of the first spacer is greater than the number of the second spacer and the number of the third spacer, and a supporting force of the first spacer per unit area is substantially same as the supporting force of the second and third spacers per unit area.

28. The method of claim 24, wherein a number of the second spacer and a number of the third spacer are plural respectively, and each of the second spacer and each of the third spacer are arranged in a line that is substantially perpendicular to a liquid crystal injection direction.

29. The method of claim 24, wherein a number of the second spacer and a number of the third spacer are plural respectively, and the second and third spacers are disposed alternately to form a zigzag shape.

30. The method of claim 24, wherein the liquid crystal inlet is sealed by a sealing member.

31. The method of claim 30, wherein the sealing member comprises a material that is hardened when an ultraviolet light is irradiated.

32. The method of claim 24, wherein (a) the first display part includes i) a first electrode, ii) a switching device that is electrically connected to the first electrode, iii) a first wiring that is electrically connected to the switching device so as to apply a first voltage to the first electrode, and iv) a second wiring that is electrically connected to the switching device so as to determine a time for applying the first voltage to the first electrode, and (b) the second display part includes a second electrode facing the first electrode.

33. A method of manufacturing a liquid crystal display apparatus, comprising:

forming a first display part on a first mother substrate;

forming a second display part on a second mother substrate, such that the second display part faces the first display part;

forming a seal line having a liquid crystal inlet along a boundary of the first display part;

forming first and second spacers on the first display part and outside of the first display part corresponding to the liquid crystal inlet respectively;

forming third spacers on the outside of the first display part so as to prevent a cell gap from being narrowed;

assembling the first and second mother substrates together;

separating the first and second display parts from the first and second mother injecting a liquid crystal material into between the first and second display parts via the liquid crystal inlet; and sealing the liquid crystal inlet, wherein a width of the liquid crystal inlet is in a range of about 11 mm to about 20 mm, a number of the second spacer and a number of the third spacer are plural, a first distance between the second spacers and between the third spacers is in a range of about 1.5 mm to about 2.0 mm, and a second distance between the second spacer and an edge of the liquid crystal inlet and between the third spacer and the edge of the liquid crystal inlet is in a range of about 0.5 mm to about 1.5 mm.

* * * * *